(12) United States Patent
Chang et al.

(10) Patent No.: US 6,891,803 B1
(45) Date of Patent: May 10, 2005

(54) TELECOMMUNICATIONS TRANSMISSION TEST SET

(75) Inventors: Paul Chang, Fremont, CA (US); Tom Dang, San Jose, CA (US); Chi Lin Wu, San Jose, CA (US)

(73) Assignee: Sunrise Telecom, Inc., San Jose, CA (US)

( * ) Notice: Subject to any disclaimer, the term of this patent is extended or adjusted under 35 U.S.C. 154(b) by 0 days.

(21) Appl. No.: 09/215,421

(22) Filed: Dec. 18, 1998

(51) Int. Cl.$^7$ .............................................. H04L 12/66
(52) U.S. Cl. ........................ 370/252; 370/248; 370/251; 370/247; 379/21; 379/10.01; 348/192; 714/715
(58) Field of Search ................................ 379/21, 10.01, 379/22.04, 26.01, 26.02, 26.03; 370/245, 248, 249, 503, 252, 251, 250, 247; 324/512, 520, 521, 527, 528, 534, 535, 532; 348/192; 714/715

(56) References Cited

U.S. PATENT DOCUMENTS

| | | |
|---|---|---|
| 3,956,601 A | 5/1976 | Harris et al. |
| 4,402,055 A | 8/1983 | Lloyd et al. |
| 4,536,703 A | 8/1985 | Jablway et al. |
| 4,651,298 A | 3/1987 | Currier, Jr. |
| 4,837,811 A | 6/1989 | Butler et al. |
| 4,843,620 A | 6/1989 | Hagedorn |

(Continued)

FOREIGN PATENT DOCUMENTS

| | | |
|---|---|---|
| DE | 3116079 A1 | 11/1982 |
| DE | 3743446 A1 | 7/1989 |
| DE | 3912230 C1 | 10/1990 |
| DE | 3933222 A1 | 4/1991 |
| DE | 4025417 A1 | 2/1992 |
| DE | 19509690 A1 | 9/1996 |
| EP | 053 561 A2 | 6/1982 |
| EP | 532 346 A2 | 3/1993 |

OTHER PUBLICATIONS

Disclosure Statement on behalf of Assignee Sunrise Telecom, Inc., with attached Declaration of Robert King, Vice President—North American Sales, Sunrise Telecom, Inc.
Declaration of Paul Marshall, Chief Operating Officer, Vice President of Marketing and Acting Chief Finanical Officer of Sunrise Telecom Incorporated, San Jose, CA, dated Mar. 3, 2004, pp. 1–3, with Exhibits A, B and C.
Specialized Products Company, 1994 Spring Catalog, pp. 152, 168–169.
Itronix Brochure, "T5000 EFP handheld Mobile Workstation," undated.
"Testing ATM Interoperability—HP Solution Note", 5965–9334E Jun. 1997 Rev. A, 1997 ATM/Broadband Testing Seminar, Hewlett–Packard Company.

(Continued)

Primary Examiner—Wellington Chin
Assistant Examiner—Chuong Ho
(74) Attorney, Agent, or Firm—Townsend and Townsend and Crew LLP

(57) ABSTRACT

A test set includes at least one signal input port, a test circuitry, a processor, a user-input device, and a display. The test circuitry couples to and receives signals from the at least one signal input port. The test circuitry then generates test data corresponding to the received signals. The processor couples to and receives test data from the test circuitry and generates test results. The processor also couples to and receives commands from the user-input device. The processor further operatively couples to the graphical display that receives and displays the test results from the processor. In one embodiment, the test set is capable of performing line qualification and connectivity testing. A modem module can be used to facilitate connectivity testing. The modem module can be a plug-in module with a common interface to the test set. The modem module can also contain a fingerprint value that identifies the module type and the software revision number to the test set.

20 Claims, 17 Drawing Sheets

U.S. PATENT DOCUMENTS

| | | | |
|---|---|---|---|
| 4,887,260 A | | 12/1989 | Carden et al. |
| 4,894,829 A | | 1/1990 | Monie et al. |
| 4,922,516 A | | 5/1990 | Butler et al. |
| 4,996,695 A | | 2/1991 | Dack et al. |
| 5,121,342 A | | 6/1992 | Szymborski et al. |
| 5,173,896 A | | 12/1992 | Dariano |
| 5,227,988 A | | 7/1993 | Sasaki et al. |
| 5,251,150 A | | 10/1993 | Ladner et al. |
| 5,331,136 A | | 7/1994 | Koenck |
| 5,363,366 A | * | 11/1994 | Wisdom et al. ............ 370/245 |
| 5,377,128 A | | 12/1994 | McBean |
| 5,377,196 A | | 12/1994 | Godlew et al. |
| 5,377,259 A | | 12/1994 | Butler et al. |
| 5,381,348 A | * | 1/1995 | Ernst et al. ................ 324/533 |
| 5,382,910 A | * | 1/1995 | Walsh ....................... 324/532 |
| 5,432,705 A | | 7/1995 | Severt et al. |
| 5,511,108 A | | 4/1996 | Severt et al. |
| 5,521,958 A | | 5/1996 | Selig et al. |
| 5,528,660 A | | 6/1996 | Heins et al. |
| 5,530,367 A | * | 6/1996 | Bottman .................... 324/520 |
| 5,533,093 A | | 7/1996 | Horton et al. |
| 5,557,539 A | | 9/1996 | Fitch |
| 5,566,088 A | | 10/1996 | Herscher et al. |
| 5,567,925 A | | 10/1996 | Koenck et al. |
| 5,583,912 A | | 12/1996 | Schillaci et al. |
| 5,602,750 A | | 2/1997 | Severt et al. |
| 5,608,644 A | | 3/1997 | Debacker |
| 5,619,489 A | | 4/1997 | Chang et al. ............ 370/241 |
| 5,644,573 A | | 7/1997 | Bingham et al. |
| 5,715,437 A | | 2/1998 | Baker et al. |
| 5,757,680 A | | 5/1998 | Boston et al. |
| 5,790,432 A | | 8/1998 | Morys |
| 5,805,571 A | | 9/1998 | Zhan et al. |
| 5,812,786 A | | 9/1998 | Seaholtz et al. |
| 5,847,749 A | | 12/1998 | Proctor et al. |
| 5,850,209 A | | 12/1998 | Lemke et al. |
| 5,864,662 A | | 1/1999 | Brownmiller et al. |
| 5,884,202 A | | 3/1999 | Arjomand |
| 5,892,458 A | | 4/1999 | Anderer et al. |
| 5,916,287 A | | 6/1999 | Arjomand et al. |
| 5,920,608 A | | 7/1999 | Minegishi |
| 5,946,641 A | | 8/1999 | Morys |
| 5,956,385 A | | 9/1999 | Soto et al. |
| 5,982,851 A | * | 11/1999 | Kennedy et al. ............ 379/21 |
| 6,002,671 A | * | 12/1999 | Kahkoska et al. .......... 348/192 |
| 6,038,520 A | | 3/2000 | Schoonover et al. |
| 6,064,721 A | * | 5/2000 | Mohammadian et al. ..... 379/21 |
| 6,385,300 B1 | | 5/2002 | Mohammadian et al. |
| 6,590,963 B2 | | 7/2003 | Mohammadian et al. |
| 2003/0174813 A1 | | 9/2003 | Mohammadian et al. |

OTHER PUBLICATIONS

"Traveling Wave Fault Location in Power Transmission Systems", Application Note 1285, Hewlett–Packard Company, Feb. 1977, 5965–5296E.

"Accurate Transmission Line Fault Location Using Synchronized Sampling", Application Note 1276–1, Hewlett–Packard Company, 1996, 5964–6640E.

"Time Domain Reflectometry Theory", Application Note 1304–2, Hewlett–Packard Company, 1998, 5966–4855E.

* cited by examiner

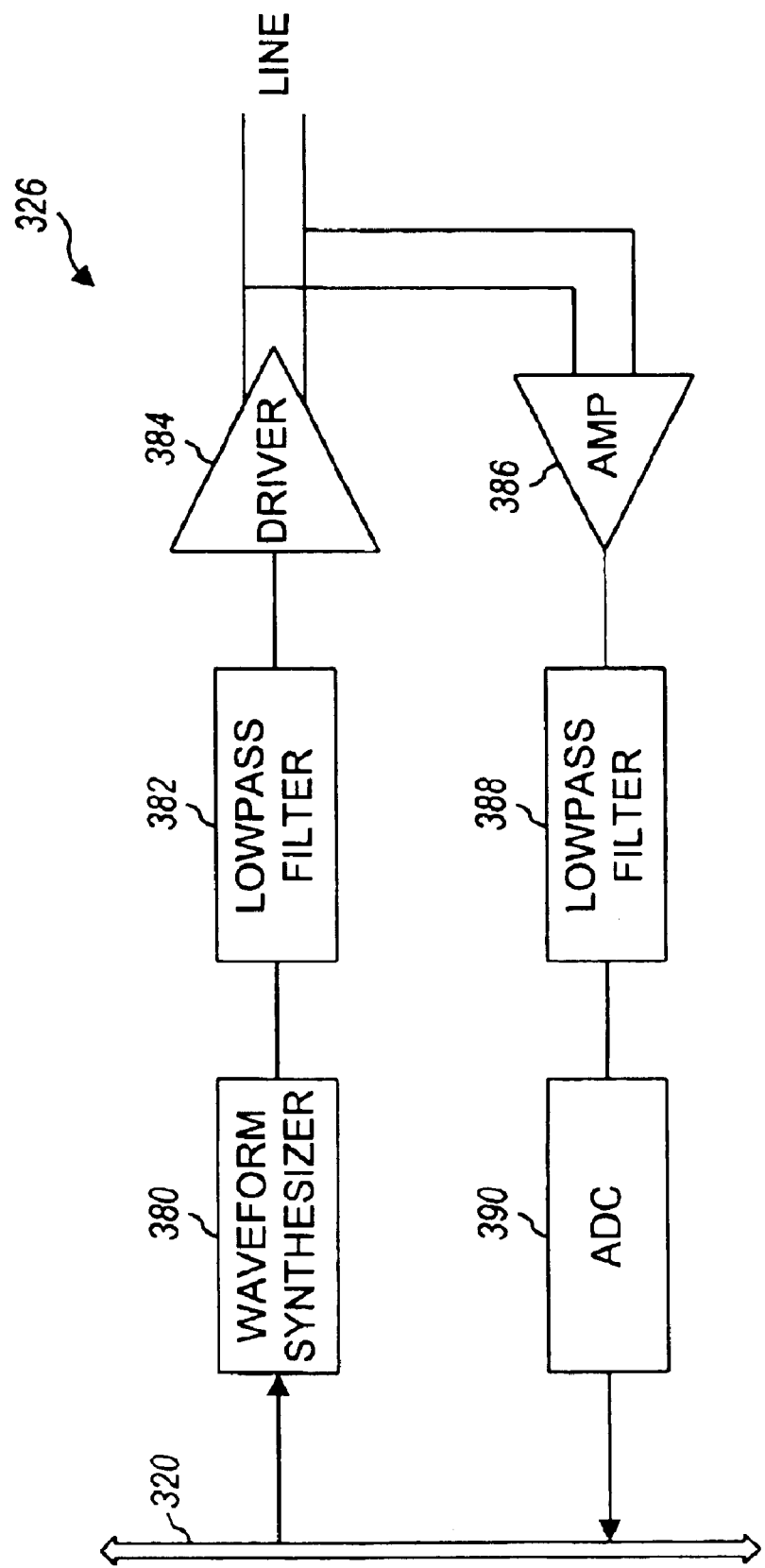

MASTER UNIT                                                    SLAVE UNIT

810

```
 123456789012345678901234567890 12
1                       12:30:55  1
2                                 2
3         LINE MEASUREMENT        3
4         MODE: [MASTER]          4
5                                 5
6         RESULT TYPE:            6
7                                 7
8         INSERTION LOSS          8
9         SIGNAL TO NOISE         9
0         BACKGROUND NOISE        0
1         LOOP RESISTANCE         1
2                                 2
3                                 3
4                                 4
5                                 5
6    MASTER    SLAVE              6
 123456789012345678901234567890 12
```

```
 123456789012345678901234567890 12
1                       12:30:55  1
2 >                        Idle < 2
3         INSERTION LOSS          3
4                                 4
5         [ADSL DMT 256]          5
6         HDSL T1 196 kHz         6
7         HDSL T1 392 kHz         7
8         HDSL E1 260 kHz         8
9         ISDN U 40 kHz           9
0         ISDN S 96 kHz           0
1         DDS 82 kHz              1
2         T1 772 kHz              2
3         E1 1.024 MHz            3
4                                 4
5                                 5
6                        START    6
 123456789012345678901234567890 12
```

FIG. 8B

```
     860
        ↘
         123456789012345678901234567890 12
       1                           12:30:55
       2 >Complete              Connected<
       3    RESULTS - SIGNAL TO NOISE
       4
       5    FREQUENCY: 196 kHz
       6    SIG/NOISE:  37 dB
       7
       ...
                                    RESTART
         123456789012345678901234567890 12
```

FIG. 8E

```
     870
        ↘
              123456789012345678901234567890 12
          1                              12:30:55   1
   880 { 2 >Complete                 Connected<     2
          3      DMT BACKGROUND NOISE               3
   882 { 4 Tone 192: 772 kHz : -102 dBm/Hz          4
          5 Tone 193: 776 kHz : -105 dBm/Hz         5
          6   -70                                   6
          7   -80  ⌐872          ⌐878               7
          8   -90        876                        8
          9  -dB                                    9
          0                                         0
          1  -120                                   1
          2  -130    874                            2
          3  -140 ─┬─────────────┬──                3
          4        1    TONE #   256                4
          5                                         5
          6   ◁◁    ▷▷   TABLE   RESTART            6
              123456789012345678901234567890 12
```

FIG. 8F

TELECOMMUNICATIONS TRANSMISSION TEST SET

BACKGROUND OF THE INVENTION

This invention relates generally to test instrumentation, and in particular to a telecommunications transmission test set for testing digital communications networks.

The advent of digital communications networks, such as the Internet, has generated great demands for high-speed data services. Conventional telephone modems can provide a limited data rate (i.e., up to 56 Kbps) before reaching the limit of performance for that technology. Other technologies, such as cable modem, can offer a leap forward in performance but are typically premised on changes in architecture that requires large investments in the communications network infrastructure.

Digital subscriber line (DSL) is a technology that offers a solution to the demand for greater bandwidth. DSL offers data rates that can be substantially higher than that of a conventional telephone modem. Furthermore, DSL uses existing twisted copper pair lines that are deployed and prevalent throughout the world. DSL delivers a basic rate access of 128 Kbps (i.e., the ISDN rate). High speed digital subscriber line (HDSL), a variant of DSL, delivers a data rate of 1.544 Mbps (T1) in North America and 2.048 Mbps (E1) elsewhere. Asymmetric digital subscriber line (ADSL), another variant of DSL, delivers data rates of 1.5 to 9.0 Mbps on the downstream path and 16 to 640 Kbps on the upstream path. More advanced variants of DSL promise even higher data rates. Collectively, DSL and variants of DSL are referred to as xDSL.

xDSL technology typically consists of a pair of modems connected to two ends of one or more twisted wire pairs, depending on the xDSL variant. One modem resides at a central office and the other modem resides at the customer premises. The twisted wire pair(s) forms a local loop. Generally, the maximum data rate is determined by the length of the local loop and the line conditions.

Installation, maintenance, and repair of an xDSL connection typically require execution of two sets of test: (1) line qualification and (2) connectivity testing. Line qualification includes tests to determine the quality of a line transmission that, in turn, determines the maximum data rate that can be achieved by an xDSL modem. Conventionally, a transmission impairment measurement set (TIMS) is used to qualify a line for xDSL service. The TIMS measures impairments such as frequency response, broadband noise, and signal power. One example of a TIMS is the OneTouch Network Assistance from Fluke Corporation that provides testing of patch cable and fiber optic cable. Unfortunately, the OneTouch Network Assistance does not provide the traditional tests normally required for line qualification and connectivity testing.

Once a line has been qualified and an xDSL modem has been installed (i.e., at the central office), connectivity testing is performed to verify data transmission over the modem. To perform connectivity testing, xDSL plug-in cards can be used. Generally, xDSL is provided by a number of manufacturers, many with proprietary designs. Thus, an xDSL plug-in card of a particular manufacturer is installed in the test equipment and connectivity tests (e.g., bit-error-rate (BER) and loopback tests) are then performed. This scheme presents a challenge to service technicians and telecommunications operators who need to maintain an inventory of xDSL plug-in cards from various vendors. In addition, the technicians need to correctly select the appropriate xDSL plug-in card for the particular local loop being tested.

A number of other challenges arise in testing digital communications networks. Conventionally, multiple types of test equipment are required to perform the various tests necessary to qualify a line and to test connectivity. For example, one type of test equipment is used to qualify a line by performing various measurements (e.g., TDR, line impairment, and so on). Another type of test equipment is then used to perform connectivity tests. The use of multiple types of test equipment increases the cost for installation, maintenance, or repair of an xDSL connection since more equipment must be maintained. Furthermore, test setup and test time are increased.

To address the test needs of digital communications networks, some test equipment manufacturers integrate multiple tests into a single test gear. One example of such integration is the CERJAC HDSL Installer's Assistance from Hewlett-Packard Company. The CERJAC HDSL Installer's Assistance performs line coil detection and insertion loss measurements (to qualify a line) and BER and transmission loopback testing (for connectivity testing).

Another challenge in testing digital communications networks arises because the line qualification and connectivity testing are often performed in a mobile environment. The service technicians generally move from site to site to test the local loop. Furthermore, access to the local loop may be limited in certain instances. Conventional test equipment are generally bulky and cumbersome, and not well suited for a mobile environment. For example, although touted as being portable, the CERJAC HDSL Installer's Assistance weighs a hefty 15 pounds.

Yet another challenge in testing arises because of the numerous amount of information that needs to be collected and presented for analysis. During the testing process, measurements are made and the test results are provided to a service technician who then configures the xDSL connection accordingly. In some conventional test sets, the test results are conveyed through simple LEDs on the front panel. However, LEDs can only display a limited amount of information. For some tests (i.e., power spectral density and load coil detection tests to qualify a line), large amounts of information are generated. Conventionally, the information is displayed or printed using alphanumeric characters. However, an alphanumeric display can be difficult to decipher and prone to mistake in interpretation.

From the above, a telecommunications transmission test set that is lightweight and portable, provides a comprehensive suite of tests, and intelligently displays test results is needed in the art.

SUMMARY OF THE INVENTION

The present invention provides a telecommunications transmission test set for testing digital communications networks. In one embodiment, the test set is capable of performing line qualification testing including digital multimeter (DMM) tests, time domain reflection (TDR) test, and line impairment tests. The line impairment tests can include insertion loss, signal-to-noise, background noise, loop resistance, and other tests. In another embodiment, the test set is further capable of performing connectivity testing including loopback test and emulation. The test set can also be capable of performing bit-error-rate test (BERT). The test results can be graphically displayed on the test set.

In one embodiment of the invention, the test set includes a modem module that facilitates connectivity testing. The modem module can be a plug-in module with a common interface. This allows one test set to be used with various modem modules. The modem module can also include a fingerprint value that identifies the modem module to the test set. The fingerprint value can indicate the module type, the software revision number, and so on. The test set then configures itself in accordance with the fingerprint value from the modem module.

A specific embodiment of the invention provides a test set that includes at least one signal input port, test circuitry, a processor, a user input device, and a display. The test circuitry couples to and receives signals from the at least one signal input port. The test circuitry then generates test data corresponding to the received signals. The processor couples to and receives test data from the test circuitry and generates test results. The processor also couples to and receives commands from the user-input device. The processor further operatively couples to the display that receives and displays the test results from the processor. In one embodiment, the test set is capable of performing line qualification and connectivity testing. The display can be a graphical display to show the test results in graphical forms.

Another specific embodiment of the invention provides a test set for testing a communications network that includes a master tester unit and a modem module. The master tester unit receives a signal from the communications network and processes the signal to produce intermediate results. The modem module couples to the master tester unit, receives the intermediate results, processes the intermediate results, and provides processed results to the master tester unit. The master tester unit then displays the processed results. In a specific implementation, the modem module is a removable module (i.e., a plug-in module) that supports the test set in testing different communications networks (i.e., from different manufacturers). For example, a different modem module can be provided for each particular communications network to be tested. The test set is configurable to perform line qualification and connectivity testing.

The foregoing, together with other aspects of this invention, will become more apparent when referring to the following specification, claims, and accompanying drawings.

BRIEF DESCRIPTION OF THE DRAWINGS

FIGS. 3B–3D show block diagrams of an embodiment of a DMM test circuit, a TDR test circuit, and a line impairment test circuit, respectively;

FIG. 8A shows an embodiment of a menu for transmission line impairment testing;

FIG. 8B shows a menu that lists sets of test frequencies for insertion loss measurement;

FIG. 8E shows an alphanumeric display of a signal-to-noise test result;

FIG. 8F shows a graphical display of background noise test results;

DETAILED DESCRIPTION OF THE SPECIFIC EMBODIMENTS

Network Configuration

Figure 1:
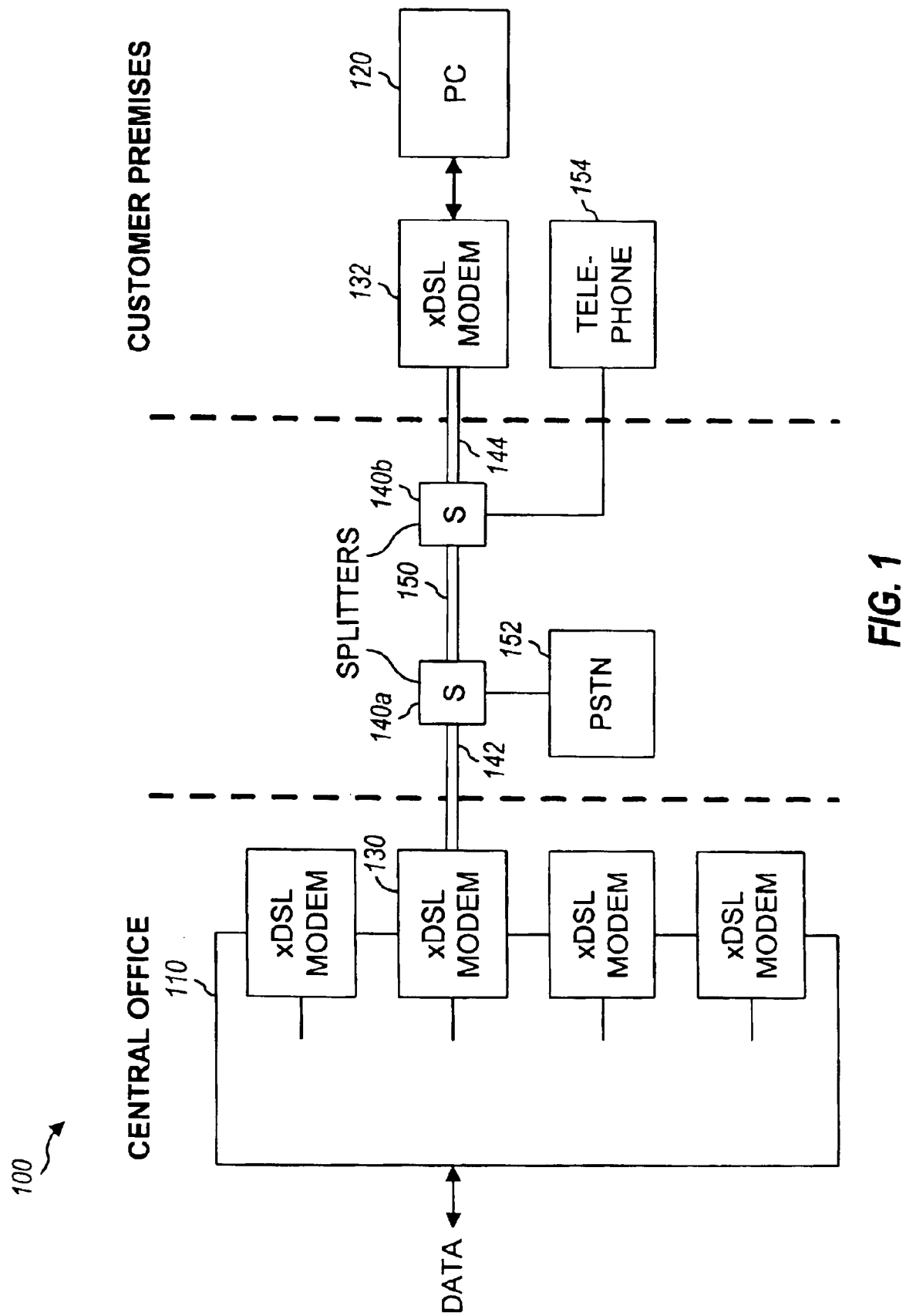
FIG. 1 shows a simplified block diagram of a digital communications network.

FIG. 1 shows a simplified block diagram of a specific embodiment of a digital communications network 100. Network 100 includes a central office 110 operatively coupled to a personal computer (PC) 120 through xDSL modems 130 and 132. xDSL modem 130 couples to central office 110 and to a splitter 140a through a channel 142. xDSL modem 132 couples to PC 120 and to another splitter 140b through a channel 144. Splitters 140a and 140b are coupled through a local loop 150 composed of one or more wire pairs, or other transmission media. Splitters 140a and 140b also couple to a public switched telephone network (PSTN) 152 and to a telephone 154, respectively, for providing a plain old telephone service (POTS). At the transmitting side, splitter 140 combines the POTS and data service into a signal suitable for transmission over local loop 150. At the receiving side, the other splitter 140 separates the received signal into the (lower frequency) voice telephone service and the (higher frequency) data service. In this manner, both voice and data can be transmitted over the same local loop concurrently without any modification to that loop.

The test set of the invention can be used to test a wide variety of communications networks, including network 100. As used herein, "communications network" generically (and broadly) refers to any structure that supports a digital service carrier using any transmission technology. The transmission technologies covered by the test set of the invention includes plain old telephone system (POTS) modem, E1, T1, Integrated Services Digital Network (ISDN), Digital Subscriber Line (DSL), High data rate DSL (HDSL), Asynchronous DSL (ADSL), Very-high data rate DSL (VDSL), Rate Adaptive DSL (RADSL), Single line DSL (SDSL), and other variants of DSL. DSL and variants of DSL are collectively referred to as xDSL. The test set of the invention can also be adopted to cover transmission technologies such as hybrid fiber coax (HFC), coaxial cable, optical fiber, and others. In a specific application, the test set of the invention is especially suited for testing communications networks implemented using one or more twisted wire pairs.

Test Set

Figure 2:
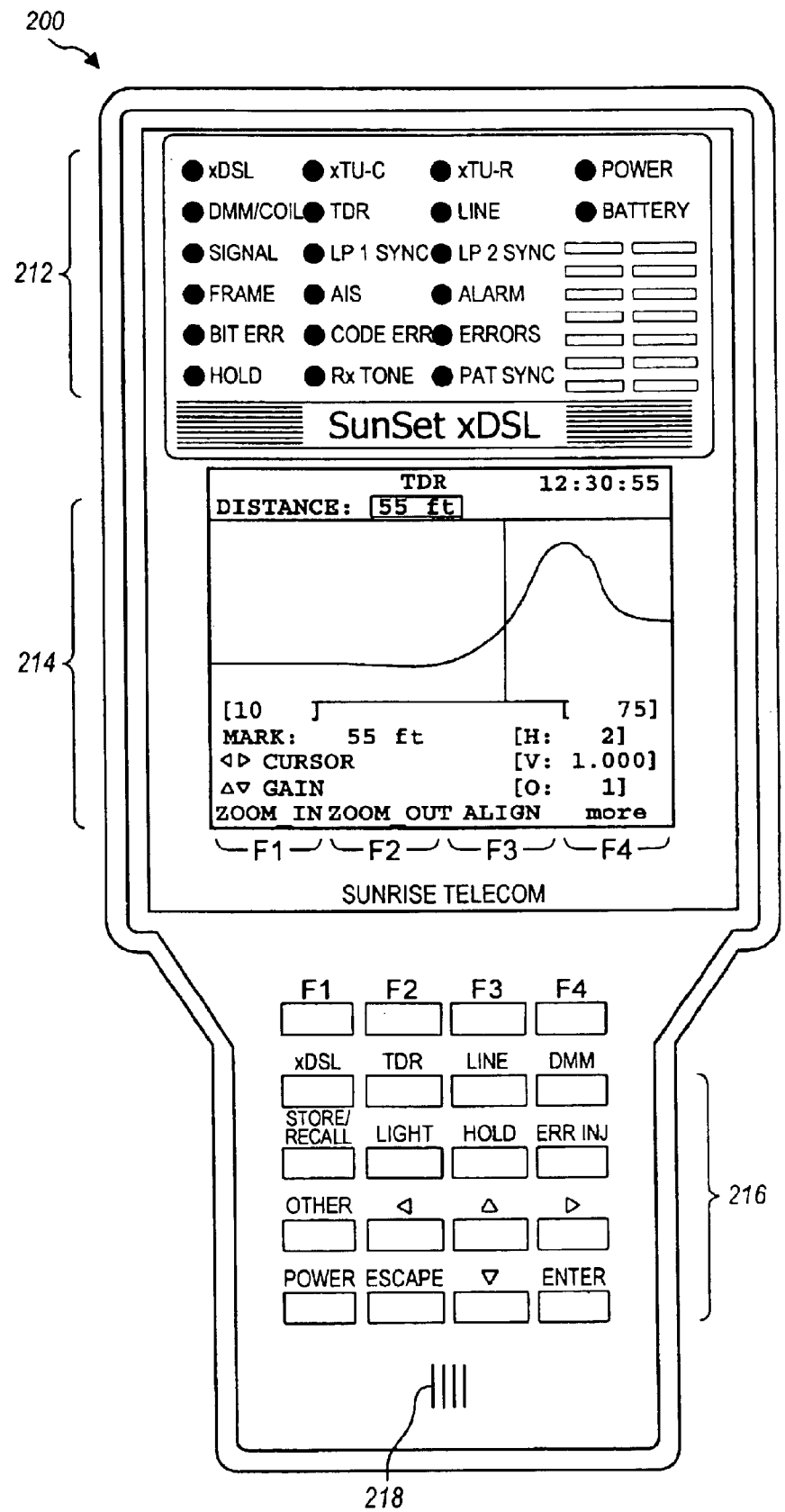
FIG. 2 shows an embodiment of a telecommunications transmission test set of the invention.

FIG. 2 shows an embodiment of a telecommunications transmission test set 200 of the invention. Test set 200 includes a light emitting diode (LED) display 212, a graphical display 214, a keypad 216, and an integrated microphone and speaker 218. LED display 212 indicates operational status of test set 200 as well as the operational mode and signal/error conditions. Graphical display 214 displays the test menu, test parameters, and test results. Graphical display 214 can display information in alphanumeric form, graphical form, or a combination of both. Graphical display 214 can be, for example a liquid crystal display (LCD). Graphical display 214 can also be substituted with an alphanumeric display. Keypad 216 allows a user to select a test mode, specify the test conditions, control the test device, dial a phone number, manipulate a graphical display, scroll an alphanumeric display, and perform other functions.

Implementation of some of the features of test set 200 is described in U.S. Pat. No. 5,619,489, entitled "HAND-HELD TELECOMMUNICATION TESTER," issued Apr. 8, 1997, assigned to the assignee of the present invention, and incorporated herein by reference.

Figure 3A:
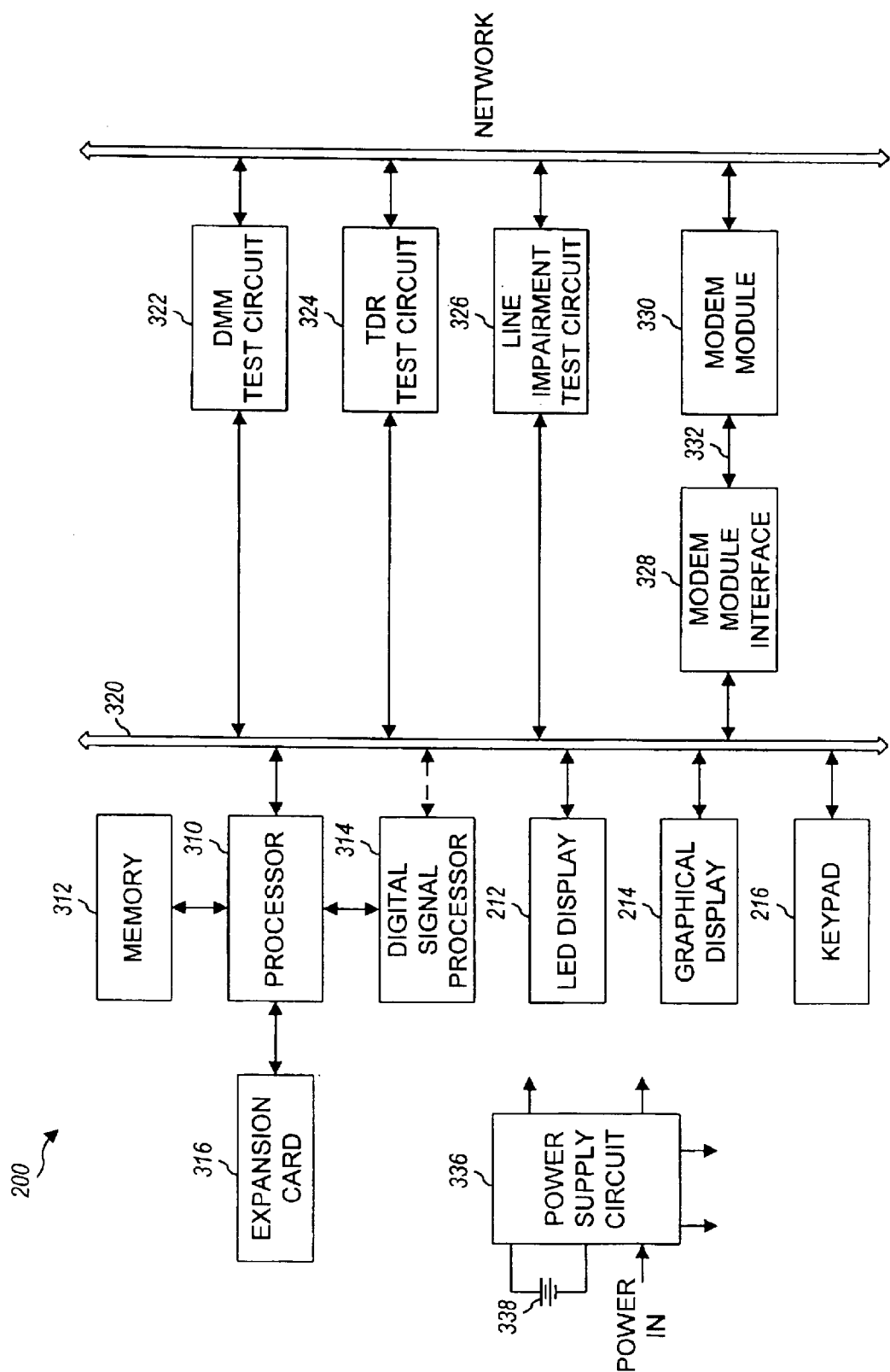
FIG. 3A shows a block diagram of an embodiment of the test set.

FIG. 3A shows a block diagram of an embodiment of test set 200. Within test set 200, a processor 310 controls the operation of the test set according to program instructions stored in a memory 312. A digital signal processor (DSP) 314 can be used to assist in the processing of data samples (i.e., filtering, transformation, and so on). DSP 314 can be implemented, for example, with a digital signal processor from the TMS320 line of processors from Texas Instruments, Inc. An expansion card 316, which is an optional element, allows for easy upgrade to more advanced test features and more applications as they become available. Processor 310 couples to memory 312, DSP 314, and expansion card 316, and further to a bus 320 for communication with other circuits within test set 200. DSP 314 can also couple to bus 320 to directly receive data sent through the bus.

Processor 310 can be implemented with a microcomputer, a microprocessor, a signal processor, an application specific integrated circuit (ASIC), or the like. Memory 312 can be implemented as a random-access memory (RAM), a read-only memory (ROM), a programmable read-only-memory (PROM), an electronically programmable read-only-memory (EPROM), a FLASH memory, registers, or other similar devices. Memory 312 can be used to store the program codes or data, or both.

LED display 212, graphical display 214, and keypad 216 also couple to bus 320. LED display 212 and graphical display 214 receive commands from processor 310 and provide the appropriate output on their respective displays. Keyboard 216 provides the user input to processor 310.

A DMM test circuit 322, a TDR test circuit 324, and a transmission line impairment test circuit 326 couple to bus 320 and to the network under test. Test circuits 322, 324, and 326 provide test signals (e.g., test tones) and perform test measurements for various line qualification tests that are discussed below. Test data generated by the test circuits is provided via bus 320 to processor 310 that further processes the data to generate the final test results which are then displayed. The design for these test circuits are known in the art and are not described.

A modem module interface 328 couples to bus 320 and a modem module 330 via a module bus 332. Modem module 330 facilitates connectivity testing and is further described below. Modem module interface 328 receives data and control signals from bus 320, formats the signals, and forwards the formatted signals to modem module 330. Modem module interface 328 also receives test data from modem module 330 and forwards the data to processor 310. Modem module interface 328 further acts as a conduit for the supply power to modem module 330.

Test set 200 also includes a power supply circuit 336 that provide power to the circuits within test set 200 and modem module 330. Power supply circuit 336 can receive power from a battery pack 338 or an external power supply source. Power supply circuit 336 can be a switching power supply circuit, or other circuits. Power source 336 can also include a charger, such as a battery charger, for charging battery pack 338 with the external power supply source.

Figure 3B:
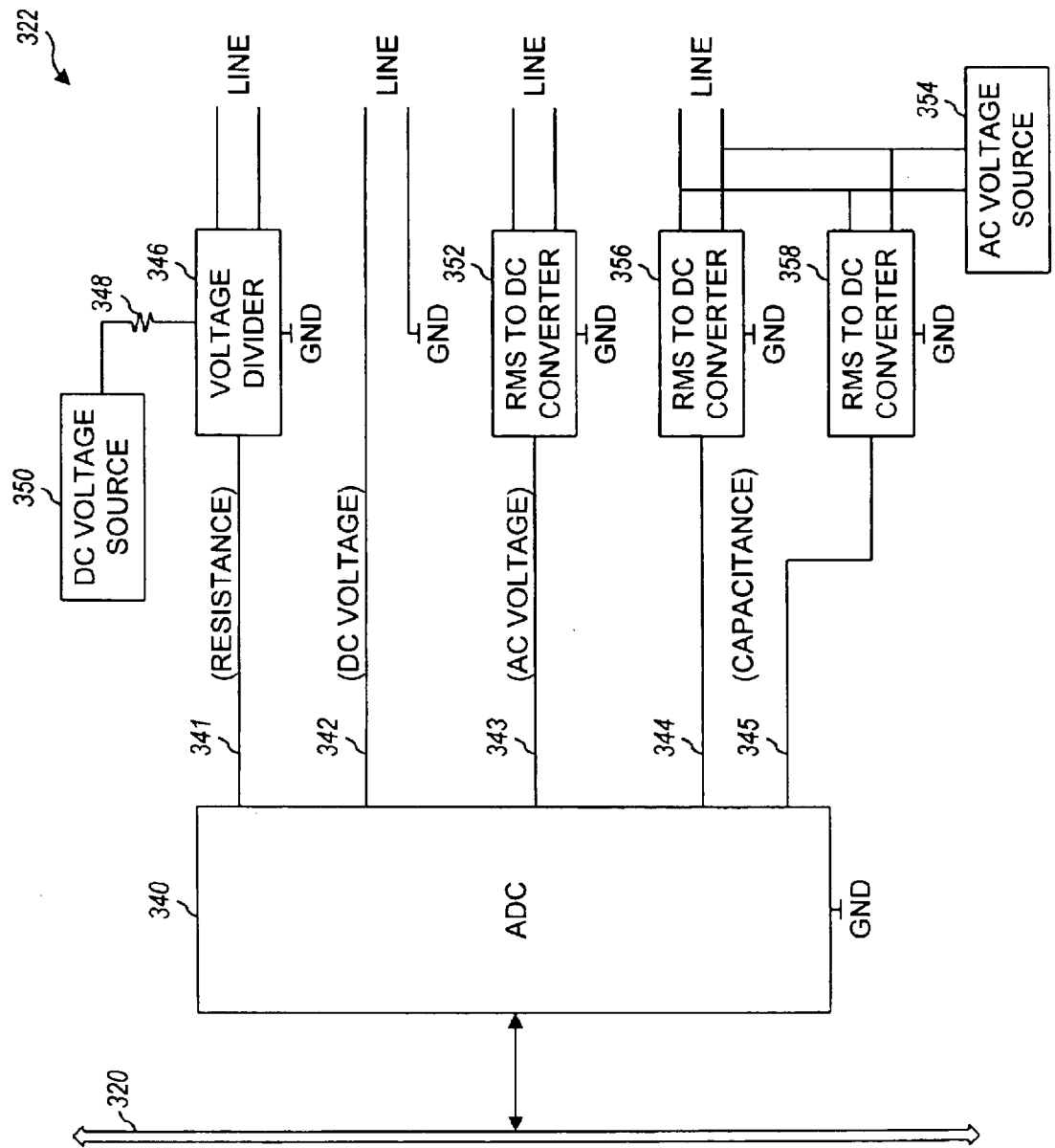

FIG. 3B shows a block diagram of an embodiment of DMM test circuit 322. In the embodiment shown in FIG. 3B, DMM test circuit 322 measures the line resistance, capacitance, DC voltage, and AC voltage. Initially, the line characteristics are converted into DC voltages by various conversion circuits. An analog-to-digital converter (ADC) 340 then samples the DC voltages on inputs 341 through 345 and provides the sampled values through bus 320 (i.e., to be received by processor 310 and/or DSP 314). The samples are then processed to determine the line characteristics.

For line resistance measurement, a voltage divider 346 converts the line resistance into a DC voltage that is then provided to ADC input 341. Voltage divider 346 couples to input 341, the line to be tested, and a test resistor 348 that further couples to a DC voltage source 350. In an embodiment, DC voltage source 350 provides eighty volts DC and test resistor 348 is forty Kohms. For DC line voltage measurement, the line to be tested is directly coupled to ADC input 342. For AC line voltage measurement, a root-mean-square (RMS) to DC voltage converter 352 converts the AC voltage on the line into a DC voltage at input 343 that is then sampled by ADC 340. And for line capacitance measurement, an AC voltage source 354 provides an AC voltage on the line under test. Two RMS to DC voltage converters 356 and 358 then convert the AC voltage on the line into DC voltages at inputs 344 and 345 that are then sampled by ADC 340. In an embodiment, AC voltage source 354 is a generator that provide a sinusoidal at 20 Hz and having 20 volts peak-to-peak amplitude.

Figure 3C:
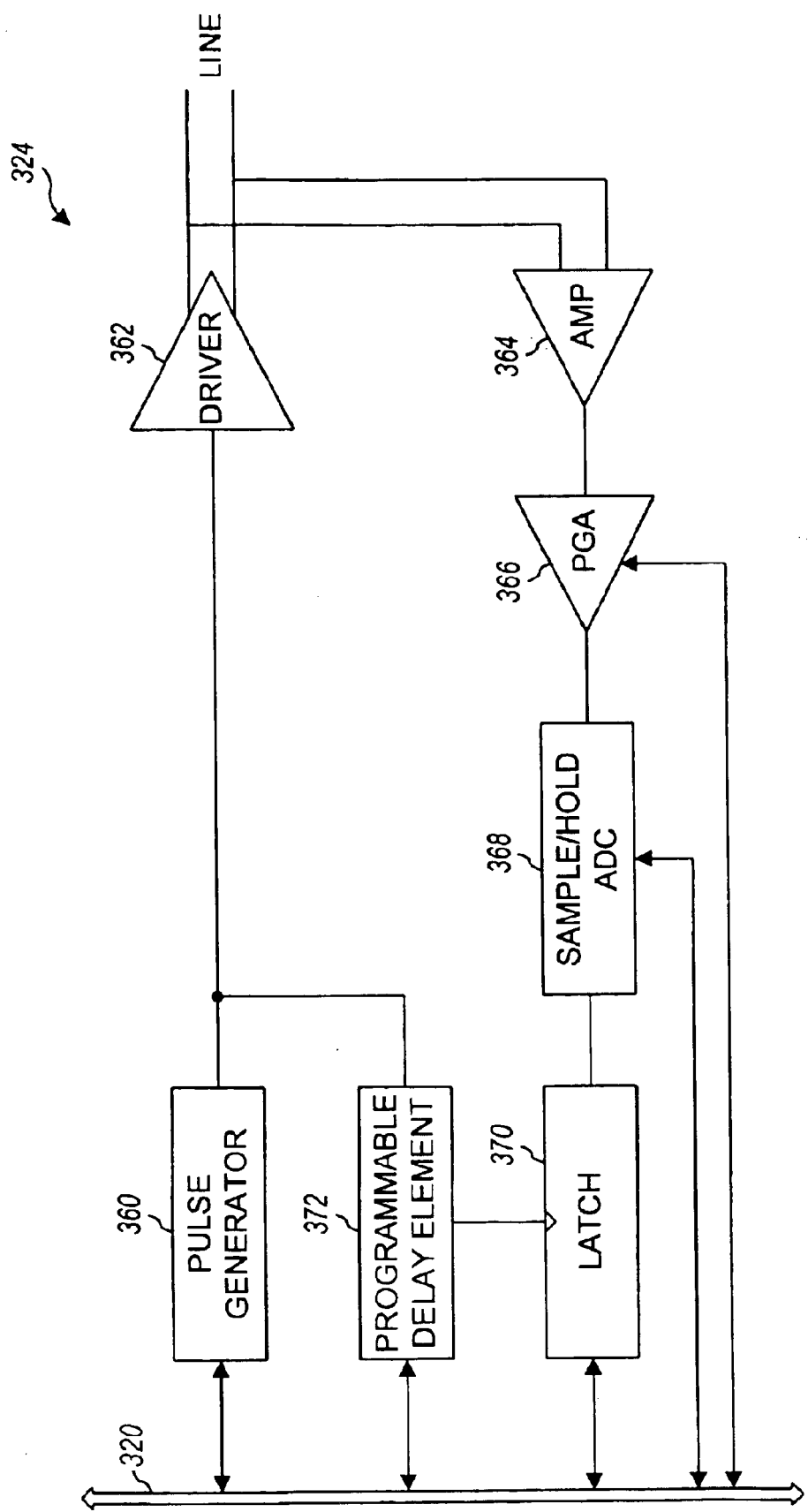

FIG. 3C shows a block diagram of an embodiment of TDR test circuit 324. A pulse generator 360 generates a pulse when directed by processor 310. In an embodiment, pulse generator 360 has a variable time base and generates a single pulse when directed. A signal driver (AMP) 362, which couples to generator 360, receives and conditions the pulse and drives the line to be tested. The reflected pulse is provided to a signal receiver 364 that conditions the received pulse. A programmable gain amplifier (PGA) 366, which couples to signal receiver 364, amplifies the conditioned pulse with a gain programmed by processor 310. A sample and hold analog-to-digital converter (ADC) 368, which couples to gain amplifier 366, samples the amplified pulse to generate sampled values. A latch 370, which couples to ADC 368, latches the sampled values and provides the latched values to bus 320. The pulse generated by generator 360 is also provided to a programmable delay element 372 that delays the pulse by a programmed amount of time and provides the delayed pulse to bus 320. As shown in FIG. 3C, generator 360, delay element 372, latch 370, ADC 368, and gain element 366 couple to bus 320 for receiving command from, and providing data to, other circuit elements that also couple to bus 320 (e.g., processor 310, DSP 314, and others).

FIG. 3D shows a block diagram of an embodiment of line impairment test circuit 326. A waveform synthesizer 380 generates a waveform (e.g., sinusoidal, squarewave, sawtooth, or others) as directed by processor 310. A lowpass filter 382, which couples to synthesizer 380, receives and filters the generated waveform. A signal driver 384, which couples to filter 382, receives and conditions the filtered signal and drives the line to be tested. The signal on the line is provided to a signal receiver (AMP) 386 that conditions the received signal. A lowpass filter 388, which couples to signal receiver 386, receives and filters the conditioned signal. An analog-to-digital converter (ADC) 390, which couples to filter 388, samples the filtered signal and provides the sampled values to bus 320. The sampled values are received and processed by, for example, processor 310 or DSP 314.

As shown in FIG. 2, test set 200 is designed to be a portable unit. In particular, test set 200 is dimensioned as a hand-held unit. In a specific embodiment, test set 200 is implemented to weigh less than three pounds, thus improving its portability feature.

Modem Module

Figure 4A:
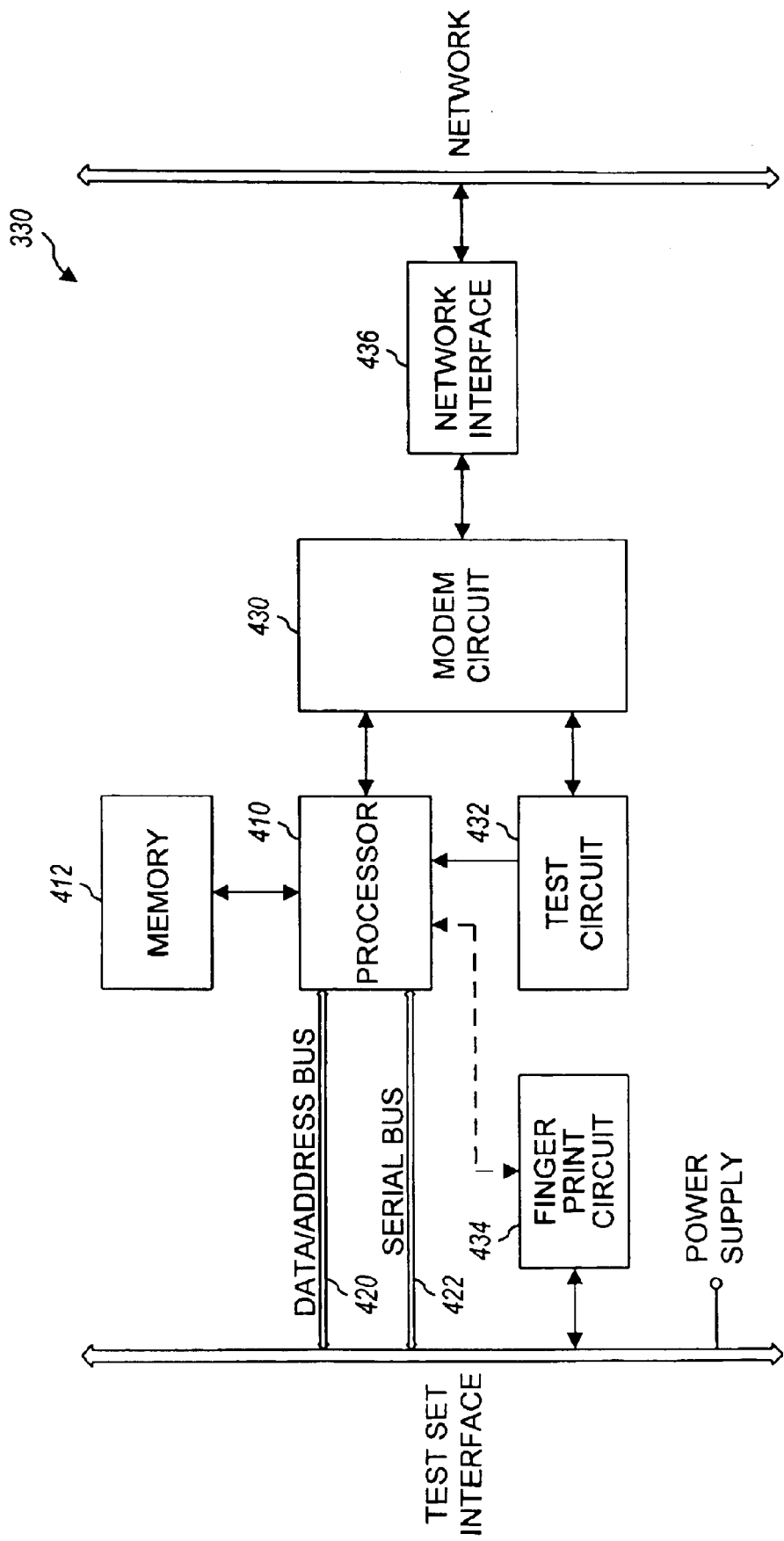
FIG. 4A shows a block diagram of an embodiment of the modem module.

FIG. 4A shows a block diagram of an embodiment of modem module 330. Modem module 330 emulates an actual xDSL modem (e.g., an Alcatel modem, a Pair-Gain modem, or modems manufactured by other vendors) that will eventually be used (i.e., at the customer premises).

As shown in FIG. 4A, modem module 330 includes a processor 410 that controls the operation of modem module 330 according to program instructions stored in a memory 412. Processor 410 couples to modem module interface 32B of test set 200 via a data/address bus 420 and a serial bus 422. Through buses 420 and 422, processor 410 can send data to and receive instructions from test set 200. Processor 410 further couples to a modem circuit 430 and an optional test circuit 432. Processor 410 also optionally couples to a fingerprint circuit 434.

Processor 410 can be implemented with a microcomputer, a microprocessor, a signal processor, an ASIC, or the like. Memory 412 can be implemented as a RAM, a ROM, a PROM, an EPROM, a FLASH memory, registers, or other similar devices. Memory 412 can be used to store the program codes or data, or both.

Modem circuit 430 emulates the actual xDSL modem that will eventually be used for the communications network. Modem circuit 430 generally includes circuits that generate, format, send, receive, and process test data. Circuits that perform at least some of these functions are typically embodied in a chip set that can be obtained from the manufacturer of the actual xDSL modem. A processor within the chip set (not shown in FIG. 4A) typically controls the various functions. Modem circuit 430 can emulate a DSL, HDSL, ADSL, or other xDSL modems. Modem circuit 430 couples to a network interface 436 that provides an interface to the communications network under test. Network interface 436 can also provide circuit protection from transient signals on the network, and other functions.

As shown in FIG. 4A, test circuit 432 couples to processor 410 and modem circuit 430. Test circuit 432 can be used to provide various functions such as, for example, to generate test patterns, to count errors, to generate signals to control the modem, and to facilitate ATM SAR testing.

Modem module 330 also includes a fingerprint circuit 434 that contains a "fingerprint" value. The fingerprint value is an identification value that identifies the a combination of: (1) the modem module type, (2) the software revision number, (3) the authorization codes, and so on, of the particular modem module 330. During an initialization stage, the fingerprint value is provided to test set 200. A table within test set 200 contains a comprehensive list of possible fingerprint values and their corresponding information. Test set 200 then determines the identity of modem module 330 by matching the fingerprint value from module 330 with that from the table.

Test set 200 can then configure itself in accordance with the fingerprint value from module 330. For example, the: module type (e.g., Alcatel or PairGain) determines which connectivity test can be performed. The software revision number determines the available tests and test configuration. The authorization code can be used to determine which tests are permissible for that modem module 330. For example, test set 200 can be designed and manufactured with the capability to perform all tests. However, the authorization code of modem module 330 determines which ones of the tests are available (i.e., based upon payment of fees). Thereinafter, if the user selects a test not permitted for that modem module 330, test set 200 can display a screen such as "Test Not Available."

In one embodiment, modem module 330 is implemented as a plug-in card that couples to test set 200. The use of plug-in card is an improvement over conventional test sets that generally include built-in circuits (i.e., fixed cards) within the test set. With the use of a plug-in card, the same test set 200 can be used to test various xDSL modems by simply swapping plug-in cards.

Data/address bus 420 can be a universal data/address/ control bus that is known in the art. Serial bus 422 can be a standard serial bus (i.e., an RS-232C bus having TTL logic levels). As shown in FIGS. 3 and 4, power supply to modem module 330 is provided by test set 200. These various interface form a common interface scheme that allows test set 200 to be coupled to various modem modules.

The common interface scheme also allows test set 200 to control most of the functions of modem circuit 430. For modem circuits that include processors, communications between test set 200 and those modem circuits can be direct. However, for modem circuits that do not include processors, processor 410 provides the necessary interface between test set 200 and those modem circuits.

Figure 4B:
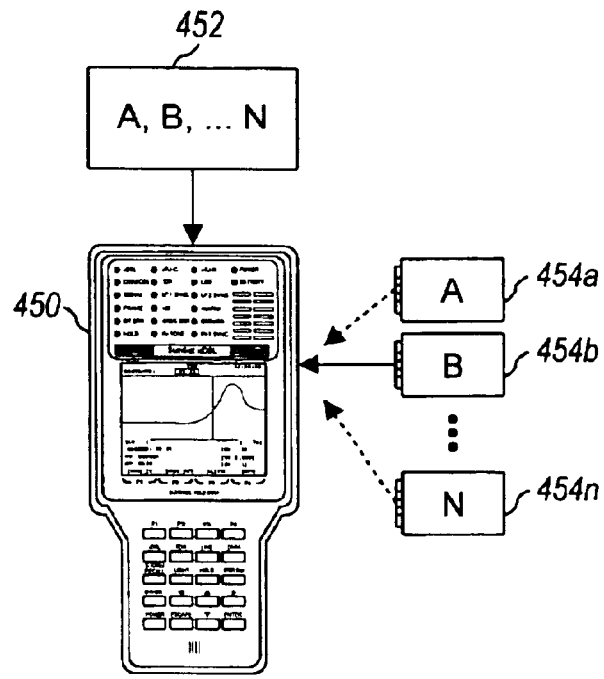
FIG. 4B shows a diagram of an embodiment for identifying a particular modem module to a test set.

FIG. 4B shows a diagram of an embodiment for identifying a particular modem module to a test set. In FIG. 4B, a common software application 452 is installed onto test set 450. For the required testing (i.e., of a particular modem manufactured by a particular vendor), one of a set of modem modules 454 is coupled to (i.e., plugged in) a test set 450. Each of modem modules 454 includes an identification value (e.g., a fingerprint value) that identifies that modem module to test set 450. Test set 450 then executes the portion of the software application applicable for that particular modem module. For example, modem module 454b can be plugged in, and the identification value from modem module 454b directs test set 450 to execute the "B" portion of application 452 that is applicable to modem module 454b.

Figure 4C:
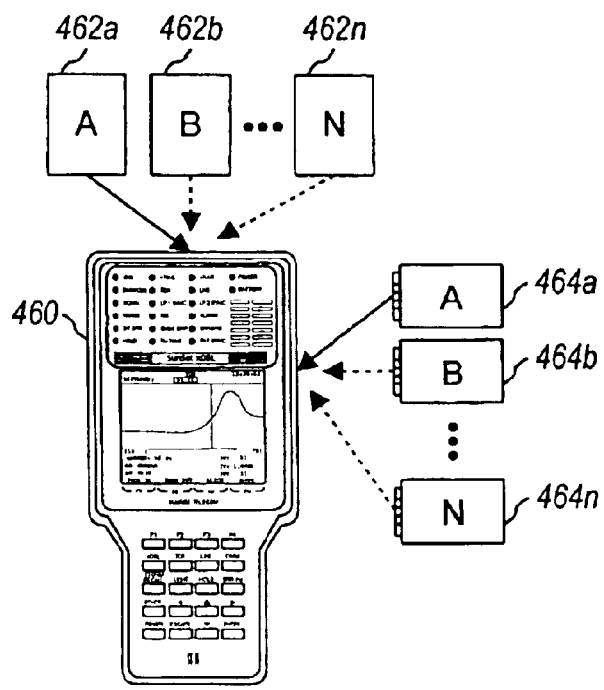
FIG. 4C shows a diagram of another embodiment for matching the proper software application with a particular modem module.

FIG. 4C shows a diagram of another embodiment for matching the proper software application with a particular modem module. As shown in FIG. 4C, a test set 460 can be loaded with one of a number of software applications 462a through 462n. Each software application 462 is designed for operation with a particular modem module 464. In this embodiment, when a particular modem module 464 is plugged in, the corresponding software application 462 is loaded onto test set 460 for execution. As shown in FIG. 4C, modem module 464a is plugged in test set 460 and corresponding software application 462a is installed.

Menu Screen

Referring back to FIG. 2, a menu screen can be displayed on graphical display 214 upon power up of test set 200. The menu screen allows the user to: (1) change test parameters; (2) select the test to be performed; (3) store and recall test setup and/or results information; and so on. The user can navigate through the menu screen using keypad 216.

Figure 5:
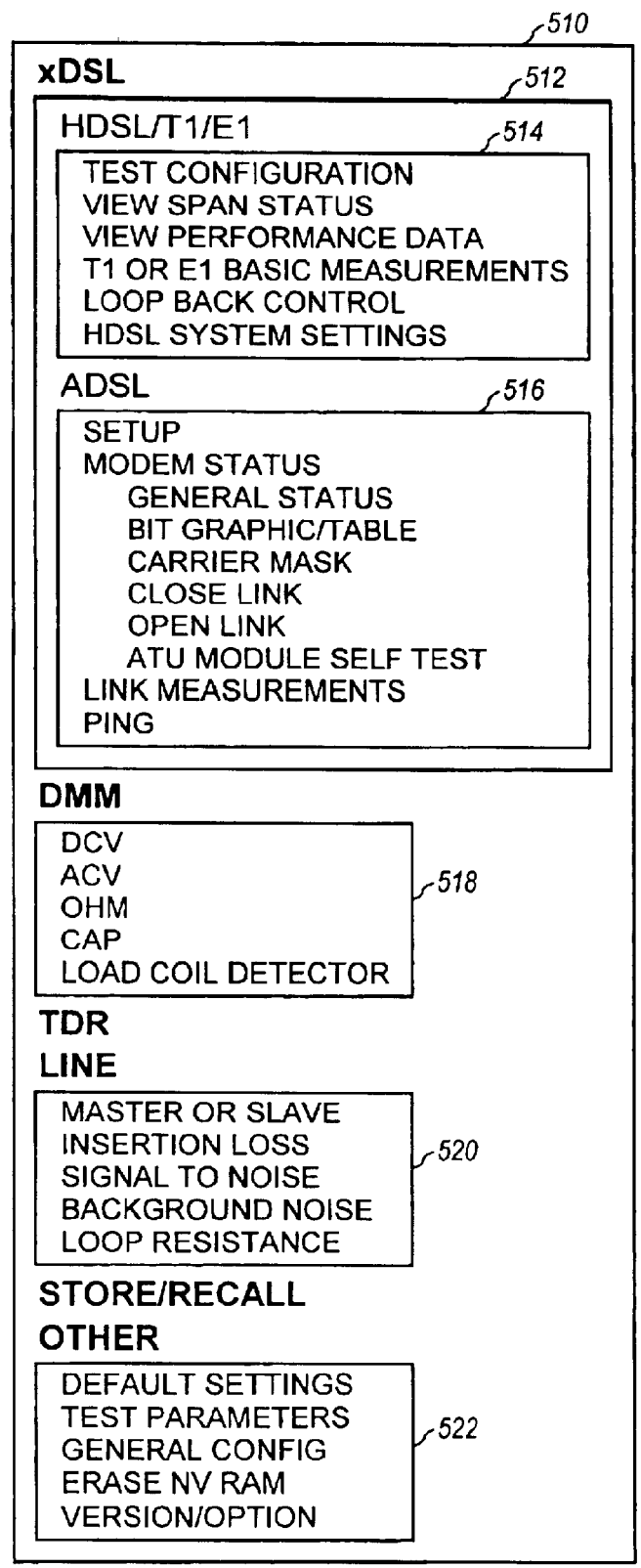
FIG. 5 shows one embodiment of a menu tree.

FIG. 5 shows one embodiment of a menu tree. A main menu 510 can be displayed upon power up of test set 200 or by depressing a proper key on keypad 216. As shown, main menu 510 includes the following choices: (1) xDSL, (2) DMM, (3) TDR, (4) Line, (6) Store/recall, and (6) other. Upon selecting the "xDSL" choice, a menu 512 is displayed. Menu 512 includes the following choices: (1) HDSL and (2) ADSL. Upon selecting the "HDSL" or "ADSL" choice, a menu 514 or 516 lists the available setup and test options.

Similarly, upon selecting the "DMM" choice in main menu 510, a menu 518 lists the available tests. Upon selecting the "Line" choice, a menu 520 lists the available tests. And upon selecting the "Other" choice, a menu 522 lists the available configuration and setup choices. For each of the menus described above, additional or different choices can be provided depending on the capability and design requirements of test set 200.

Test Capabilities

In one embodiment, test set 200 is capable of performing both line qualification and connectivity testing to allow complete installation, maintenance, and repairs of a xDSL connection. The test features are described below.

Line Qualification Tests

Line qualification includes a variety of tests that measure the quality or transmission capability of a wire pair. These tests can be grouped into three categories: (1) digital multimeter (DMM), (2) time domain reflection (TDR), and (3) transmission line impairments. DMM measurements can be used to detect shorts in the wire pair. TDR tests can be used to locate cable faults, such as the presence of loading coils, bridge taps, water, and so on. Transmission line impairment tests can be used to characterize the transmission capabilities of the line and to determine if the wire pair is suitable for xDSL transmission within a predetermined frequency range (e.g., 10 KHz to 1.5 MHz).

Digital Multimeter (DMM) Tests

Figure 6A:
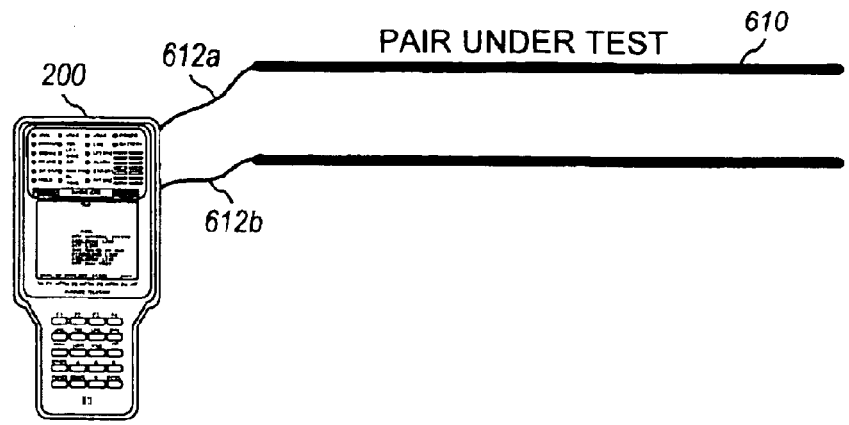
FIG. 6A shows a test set up for DMM measurements.

FIG. 6A shows a test set up for DMM measurements. Test set 200 couples to a wire pair 610 through a pair of clip cables 612. For a DMM measurement, a voltage is generated by test set 200 and provided across wire pair 610. Current is then detected from wire pair 610 to determine whether a short (i.e., low impedance or high impedance short) exists in wire pair 610. The various DMM functions are known in the art and are not discussed in detail in this specification.

In DMM mode, test set 200 can be used as a voltmeter or an ohmmeter. As a voltmeter (for both DC and AC voltage measurements), test set 200 can detect and measure (foreign) voltages on a wire pair. As an ohmmeter, test set 200 can be used to measure the resistance of a span of a wire pair. Generally, the resistance of a span is greater than five Mohm between a tip wire and ground and also between a ring wire and ground. Test set 200 can also measure the capacitance of a wire pair, which is helpful to determine the length of a line.

Test set 200 can also be used to measure loop resistance between a central office and the customer premises. The loop resistance is a DC measurement of the line. In one implementation of this test, two test sets are used, one located at the central office and the other at the customer premises. In an alternative implementation, one test set is used and the far end of the line is shorted. The loop resistance measurement can be used to verify that continuity exists between the central office and the customer premises and that no physical faults (e.g., grounds, shorts, or opens) exist in the loop.

For the various tests, the test result can be displayed on graphical display 214. Generally, an alphanumeric display of the measured voltage, resistance, or capacitance is adequate. The values can also be automatically scaled (i.e., using nano, micro, milli, kilo, mega, or other suitable prefixes) and formatted.

Time Domain Reflectometer (TDR) Tests

TDR operates by sending a test pulse down a wire pair and measuring the reflections to determine "events" along the wire pair. The reflections are influenced both by events that are normally expected (i.e., gauge changes and splices) and events that are undesirable (i.e., water, shorts, and opens). The events identify changes in the impedance of the wire pair, such as those caused by changes in: (1) insulation material (e.g., water), (2) conducting material (e.g., corrosion), (3) capacitance (e.g., a split), and others.

For TDR tests, the configuration as shown in FIG. 6A is used. Test set 200 sends out pulses of energy, one pulse at a time. When a reflection occurs, test set 200 measures the amplitude of the reflected pulse and the time interval between the transmission of the pulse to the reception of the reflected pulse. The measured time interval is used to determine the distance to the event. The amplitude of the reflected pulse is then plotted against distance. A bump (i.e., upward deflection from a baseline measurement) in the display indicates a high-impedance event. Alternatively, a dip (i.e., downward deflection from a baseline measurement) indicates a low-impedance event, such as a short. Based on the graphical display, a user can determine a fault and the distance to the fault.

Figure 6B:
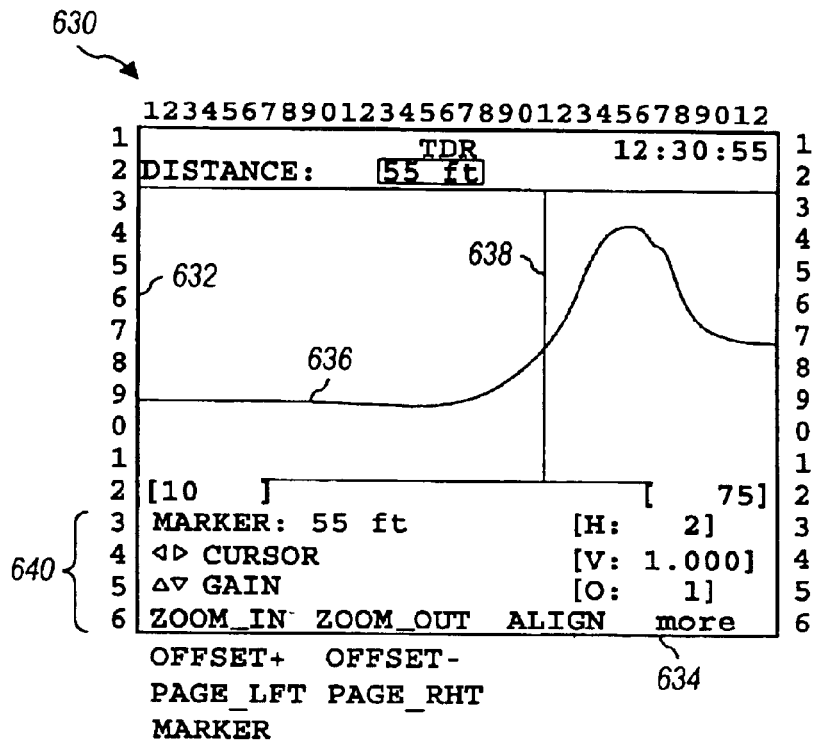
FIG. 6B shows a graphical display of TDR test results, with "cursor" control.

FIG. 6B shows a graphical display of TDR test results, with "cursor" control. A result screen 630 can be reached from other menus of test set 200 by depressing the proper key on keypad 216. A vertical axis 632 represents the amplitude of the measured reflected pulse. A horizontal axis 634 represents distance. The vertical scale on axis 632 can be adjusted by depressing the Up and Down arrow keys on keypad 216. Similarly, the horizontal scale on axis 634 can be adjusted by depressing the F-keys on keypad 216. An output graph 636 represents the measured results of the TDR measurement. Screen 630 also includes a cursor 638 that can be moved left or right by the Right and Left arrow keys on keypad 216.

An alphanumeric display section 640 lists pertinent data associated with the reflected pulse at the location of cursor 638. The data can include the amplitude of the reflected pulse, the distance to cursor 638, and so on. At the bottom of display section 640 are listed display options that can be selected using the Function keys. The options can include zoom in, zoom out, offset +, offset –, page left, page right, and so on.

In one embodiment, as cursor 638 is moved to a pulse, vertical axis 632 is automatically adjusted (i.e., by adjusting the vertical gain, the vertical offset, or both) so that the pulse fits within screen 630. The pulse can also be moved to the center of screen 630 by depressing another key (not shown).

Figure 6C:
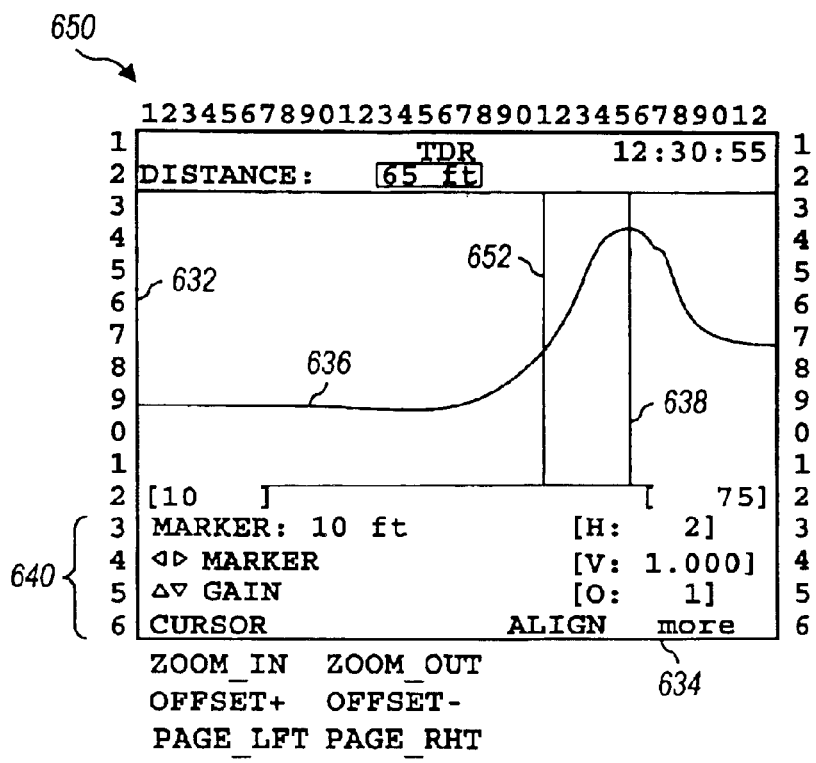
FIG. 6C shows a graphical display of TDR test results, with "marker" control.

FIG. 6C shows a graphical display of TDR test results, with "marker" control. A result screen 650 is similar to result screen 630, but includes a marker 652 that can be selected with, for example, the F1 key (see above discussion related to FIG. 6B). The marker can be moved left or right by depressing the left or right arrow key on keypad 216. However, instead of listing the data at cursor 638 as with screen 630, display section 640 lists the difference between marker 652 and cursor 638.

TDR can be used to locate various impairments in a wire pair that are detrimental for high-speed data transmission. The impairments include load coils, split pairs, bridge taps, laterals, water, intermittent faults, and so on. A load coil is an inductive component placed on a telephone line to improve the frequency response over the audio band (i.e., for voice communication). However, the load coil causes a sharp roll off at high frequency and needs to be removed for high-speed digital data transmission. A split pair is caused when two tips of the same color, but from different pairs, are inadvertently spliced together. A bridge tap (i.e., similar to a splice) is interposed on a wire pair to allow attachment an additional circuit to the wire pair. A lateral is a portion of a cable pair that is not in the direct path between the central office and the customer.

TDR tests are further described in a product application note entitled "Time Domain Reflectometry Theory" published by Hewlett-Packard Company in May 1998. Methods for determining fault locations are further described in a product application note entitled "Accurate Transmission Line Fault Location Using Synchronous Sampling" published by Hewlett-Packard Company in June 1998. Techniques for determining fault locations are also described in a product application note entitled "Traveling Wave Fault in Power Transmission Systems" published by Hewlett-Packard Company in February 1997. These application notes are incorporated herein by reference.

Transmission Line Impairment Tests

Figure 7:
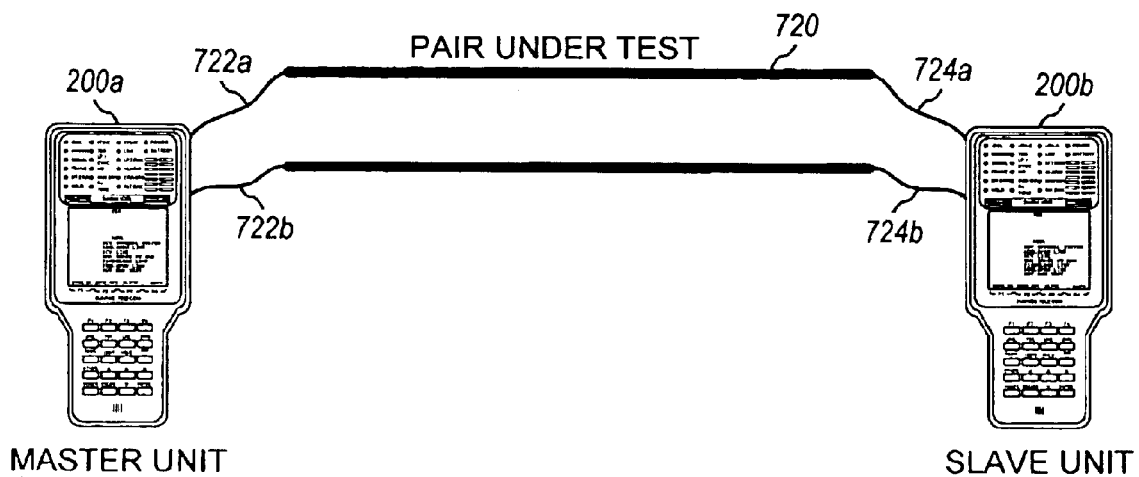
FIG. 7 shows a test set up for transmission line impairment testing.

FIG. 7 shows a test set up for transmission line impairment testing. For this testing, two test sets 200a and 200b are used. Test sets 200a and 200b couple to wire pair 720 through respective pairs of clip cable 722 and 724. Test sets 200a and 200b are configured in a particular manner, depending on the test being conducted. Generally, master test set 200a conducts the measurements and slave test set 200b generates the required tones and properly terminates the far end of wire pair 720. Transmission impairment tests are further described in the publication ANSI T1.413, which is incorporated herein by reference.

FIG. 8A shows an embodiment of a menu 810 for transmission line impairment testing. Menu 810 can be reached from other menus of test set 200 by depressing the proper key on keyboard 216. Transmission impairment testing consists of the following measurements: (1) insertion loss, (2) signal-to-noise, (3) background noise, (4) loop resistance, and others. Also shown in menu 810 is a mode selection (i.e., master or slave) for the test unit.

Insertion Loss

Insertion loss measures signal attenuation versus frequency across the wire pair. For insertion loss measurement, slave test set 200b sends a tone from the far end of the wire pair. Master test set 200a then measures the signal at the near end. Data is collected for a series of tone at various frequencies.

FIG. 8B shows a menu 820 that lists sets of test frequencies for insertion loss measurement. For ADSL discrete multi-tone (DMT) test, measurements are collected for 256 frequencies. Other test frequencies include: (1) 196 KHz for HDSL 2-pair T1, (2) 392 KHz for HDSL 1-pair T1, (3) 260 KHz for HDSL E1, (4) 40 KHz for ISDN U interface, (5) 96 KHz for ISDN S interface, (6) 82 KHz for DDS, (7) 772 KHz for T1, and (8) 1.024 MHz for E1. Alternatively, although not shown as a choice in FIG. 8B, the user can select a test frequency range and a frequency step size, thereby determining the frequencies to be tested.

Figures 8C, 8D:
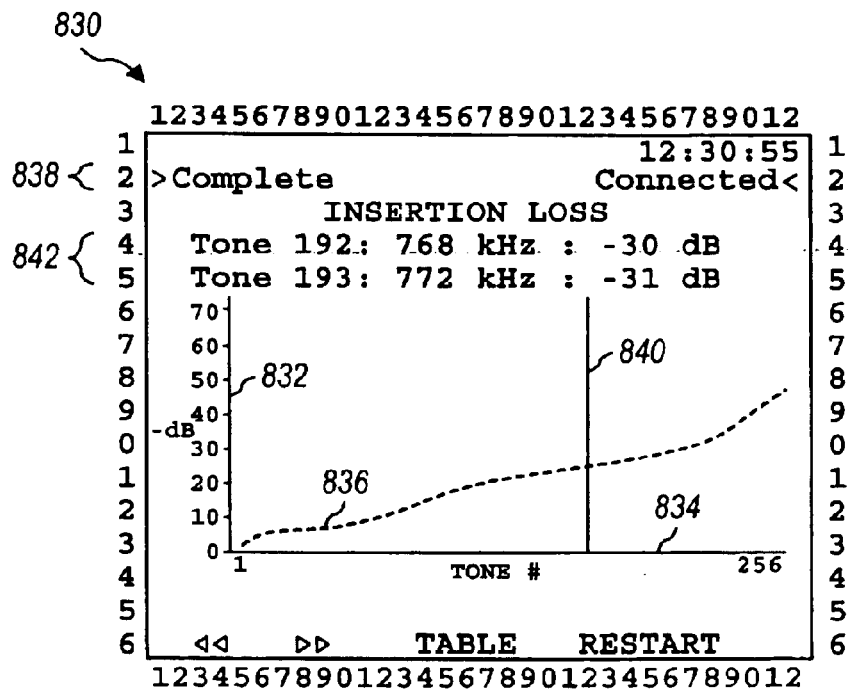
FIG. 8C shows a graph of an insertion loss test result.
FIG. 8D shows an alphanumeric display of insertion loss test results.

FIG. 8C shows a graph of an insertion loss test result. A result screen 830 can be reached from other menus of test set 200 by depressing the proper key on keyboard 216. A vertical axis 832 represents the value of the insertion loss measurement. A horizontal axis 834 represents frequency or the tones of interest. An output graph 836 represents the measured result of the insertion loss measurement. A result can be plotted as each data point (or each frequency) is collected. A status message 838 indicates the status of the test. For example, "Testing" can be used to show that testing is in progress and "Complete" can be used to show that testing is finished. A cursor 840 can be placed anywhere on output graph 836. An alphanumeric display section 842 lists pertinent data associated with the test result at the location of cursor 840. Vertical axis 832, horizontal axis 834, and cursor 840 and be adjusted in similar manner to that described above for the TDR test.

FIG. 8D shows an alphanumeric display of insertion loss test results. A result screen 850 lists the frequencies and the corresponding measured values. Screen 850 can be used to display a more precise listing than output graph 836 shown in screen 830.

Although not shown, a setup screen can be created for the graph configuration and default values being used. The setup screen can include: (1) the unit being used (i.e., English or metric), (2) the gauge of the wire, (3) the propagation velocity, (4) the cable length, and other information.

Signal-to-Noise Ratio

Signal-to-noise ratio (SNR) measures the noise on a wire pair over a frequency band of interest. Referring to FIG. 7, for signal-to-noise ratio measurement, slave test set 200b sends a tone from the far end of wire pair 720. Master test set 200a then performs measurements at the near end. The test result is then displayed. As with the insertion loss measurement, various frequencies can be tested for different operating modes.

In one embodiment, the SNR measurement is computed in accordance with the following equation:

$$SNR = \text{Signal}(dBm/Hz) - \text{Noise}(dBm/Hz), \quad \text{Eqn. (1)}$$

where Signal and Noise are the signal and noise power, respectively, in units of dBm/Hz. In accordance with ANSI T1.413 specification, equation 1 can be expressed as:

$$SNR = -40\ dBm/Hz - \text{Insertion Loss}(dB) - \text{Noise}(dBm/Hz) \quad \text{Eqn. (2)}$$

where Insertion Loss is the insertion loss of the line under test.

FIG. 8E shows an alphanumeric display of a signal-to-noise test result. A result screen 860 lists the frequency under test and the signal-to-noise ratio measurement result. Additional information (not shown) can also be displayed on screen 860, such as the center frequency and the noise bandwidth, the start and stop frequency, the noise filter used, and so on.

Background Noise

Background noise measures the noise characteristics on the wire pair over a frequency band of interest. Referring back to FIG. 7, for background noise measurement, slave test set 200b terminates the far end of wire pair 720 with the characteristic impedance of wire pair 720. Master test set 200a then performs measurement of the extraneous signals at the near end. A filter within test set 200a can be used for improved measurements. Example filters include: (1) an E-filter having a (−3 dB) passband of 1 KHz to 50 KHz (for ISDN BRA DSL) and a characteristic impedance of 135 ohm, (2) an F-filter having a passband of 5 KHz to 245 KHz (for HDSL) and a characteristic impedance of 135 ohm, (3) an G-filter having a passband of 20 KHz to 1.1 MHz (for ADSL) and a characteristic impedance of 100 ohm, and other filters.

FIG. 8F shows a graphical display of background noise test results. A result screen 870 includes a vertical axis 872, a horizontal axis 874, an output graph 876, and a cursor 878. Screen 870 can also include a status message 880 indicating the status of the test. A result can be plotted as each data point (i.e., for a frequency) is collected. Cursor 878 can be placed anywhere on output graph 876. An alphanumeric display section 882 lists pertinent data associated with the test result at the location of cursor 878. Vertical axis 872, horizontal axis 874, and cursor 878 and be adjusted in similar manner to that described above. The results shown in screen 870 can also be displayed on an alphanumeric table, as described above. Furthermore, the background noise of the filters used in the testing can also be measured and displayed.

Loop Resistance

Loop resistance measures the impedance of a wire pair. Referring back to FIG. 7, for loop resistance measurement, slave test set 200*b* short circuits the far end of the wire pair. Master test set 200*a* then performs measurements at the near end. The test result is then displayed.

Connectivity Testing

After a line has been qualified, connectivity testing is typically performed to verify proper operation of the actual xDSL modem cards to be used. Typically, a plug-in card that emulates the xDSL modem is installed on the test set. Then, a set of tests is performed to measure the quality of data transmission through the xDSL modem. Connectivity tests include: (1) HDSL transceiver unit—remote terminal end (HTU-R) or HDSL transceiver unit—central office end (HTU-C) function, (2) xDSL payload bit-error-rate test (BERT), (3) xDSL T1/E1 framed BERT, (4) BERT using one of a set of predetermined pattern, (5) HTU-R and HTU-C loopback codes, (6) HTU-C line power generation implemented by an external power supply, (7) HTU-R acceptance of line power from HTU-C, and other tests.

The use of the plug-in card (or a "universal" plug-in) provides many advantages. Generally, the modem interface is unique from one modem vendor to another. For example, Alcatel SA, Motorola Inc., Pairgain Technologies Inc., NEC Corporation, and Lucent Technologies Inc. are among the vendors that use different modem chip sets having different interfaces. The plug-in card of the invention can be designed to interface with these various modems, thereby allowing testing of multiple (seemingly incompatible) modems with one test set.

A network can be viewed as being composed of various layers, with each layer performing a defined function. Each layer communicates with the layer above or below it, or both. An Open System Interconnection (OSI) network is composed of seven layers including: (1) a physical layer, (2) a data link layer, (3) a network layer, (4) a transport layer, (5) a session layer, (6) a presentation layer, and (7) an application layer. The physical layer transmits bit streams across the physical transmission system. The data link layer provides for a reliable data transmission. The network layer routes data from one network node to another. The transport layer provides data transfer between two users at a predetermined level of quality. The session layer manages the data exchange. The presentation layer presents information to the users in a meaningful manner. Finally, the application layer monitors and manages the computer network. The layers are further described by G. Nunemacher in "LAN Primer", M & T Books, pg. 179–181, which is incorporated herein by reference.

Layer 1 testing by test set 200 includes BERT, loopback control test, and other tests. BERT includes tests using any permutation of the following parameters: (1) T1 or E1, (2) in HTU-C mode, in HTU-R mode, from T1 access point, or from E1 access point. Loopback control test includes HTU-C, HTU-R, and CSU/NIU tests.

Layer 2 testing by test set 200 includes emulation, loopback, and other tests. For HDSL, HTU-R emulation, HTU-C emulation, HTU-R loopback, and HTU-C loopback can be performed. HTU-R loopback is a regenerative loop back of the DSX-1 signal toward the network and HTU-C loopback is a regenerative loop back of the DS1 signal toward the network.

Layer 3 testing by test set 200 includes IP ping test and other tests. As an analogy, testing layer 2 and 3 is akin to testing a microphone by saying "hello." For this test, a source unit sends a message to a far end unit that replies with a message back to the source unit.

The test set of the invention can be designed to test various protocols including ISDN, Asynchronous Transfer Mode (ATM), Frame Relay, and others. ATM interoperability testing is further described in a product literature entitled "Testing ATM Interoperability," published by Hewlett-Packard Company in June 1997, and incorporated herein by reference.

Emulation

Figure 9A:
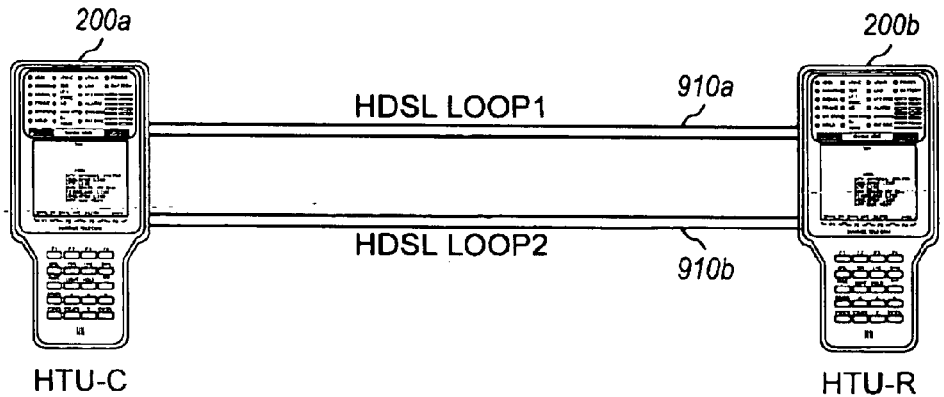
FIG. 9A shows a test set up for dual HTU-C and HTU-R emulation over two wire pairs.

FIG. 9A shows a test set up for dual HTU-C and HTU-R emulation over two wire pairs. Test set 200*a* couples to one end of wire pairs 910*a* and 910*b*. Test set 200*b* couples to the other end of wire pairs 910*a* and 910*b*. The emulation test is used to verify that the wire pairs can support HDSL with an acceptable error rate.

Figure 9B:
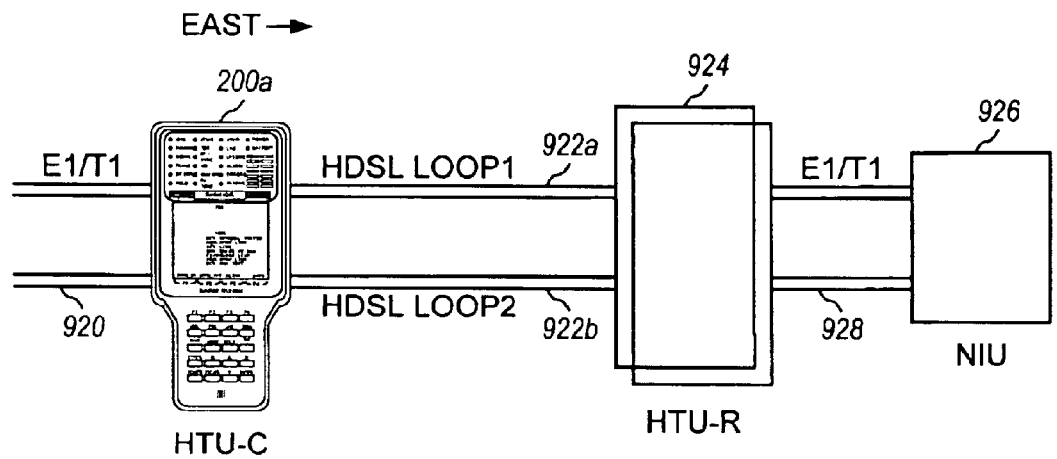
FIG. 9B shows a test set up for in-service HTU-C or HTU-R function.

FIG. 9B shows a test set up for in-service HTU-C or HTU-R function. Test set 200*a* couples to a T1/E1 connection 920 and to one end of wire pairs 922*a* and 922*b*. The other end of wire pairs 922*a* and 922*b* couples to an HTU-R 924 that further couples to a NIU 926 through a T1/E1 connection 928.

Figure 9C:
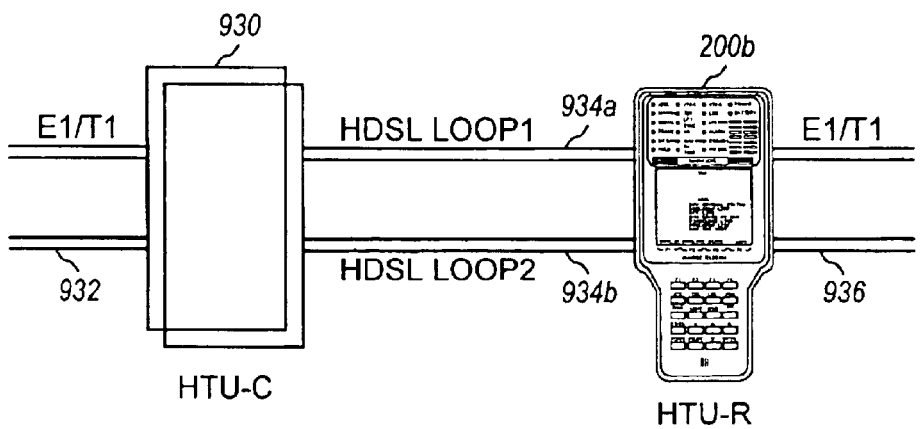
FIG. 9C shows a complementary test set up to that of FIG. 9B.

FIG. 9C shows a complementary test set up to that of FIG. 9B. HTU-C couples to a T1/E1 connection 932 and to one end of wire pairs 934*a* and 934*b*. The other end of wire pairs 934 couples to test set 200*b* that further couples to a T1/E1 connection 936.

In the in-service HTU-C or HTU-R function mode, test set 200 can perform the following tests: (1) in-service BERT (east or west), (2) respond to loopback commands, (3) report modem status, (4) in-service HTU monitoring measurements, and others. In this mode, the test set simulates a line terminating unit (LTU) or a networking terminating unit (NTU).

Figure 9D:
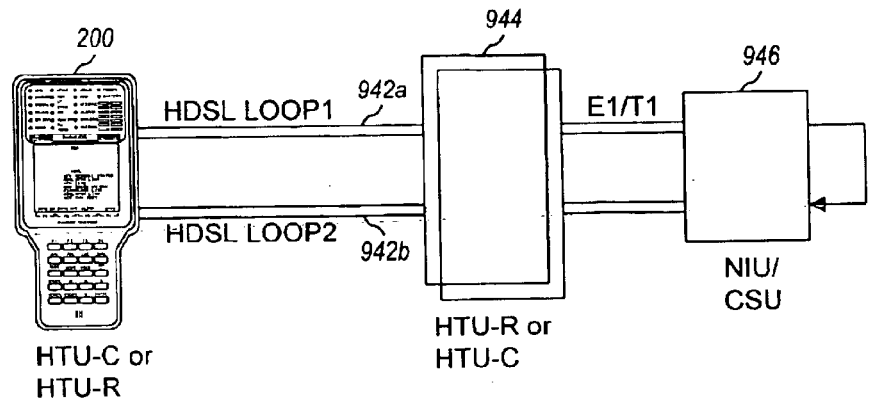
FIG. 9D shows a test set up for out-of-service HTU-C and HTU-R function.

FIG. 9D shows a test set up for out-of-service HTU-C and HTU-R function. Test set 200 couples to one end of wire pairs 942*a* and 942*b*. The other end of wire pairs 942*a* and 942*b* couples to an HTU-R or an HTU-C 944 that further couples to a NIU/CSU 946. NIU/CSU 946 is configured as a loopback.

In the out-of-service HTU-C and HTU-R function mode, test set 200 can perform the following tests: (1) BERT at T1, (2) HTU/T1 loopback, (3) modem status, and others. These tests implement the HDSL loopback test.

Figure 9E:
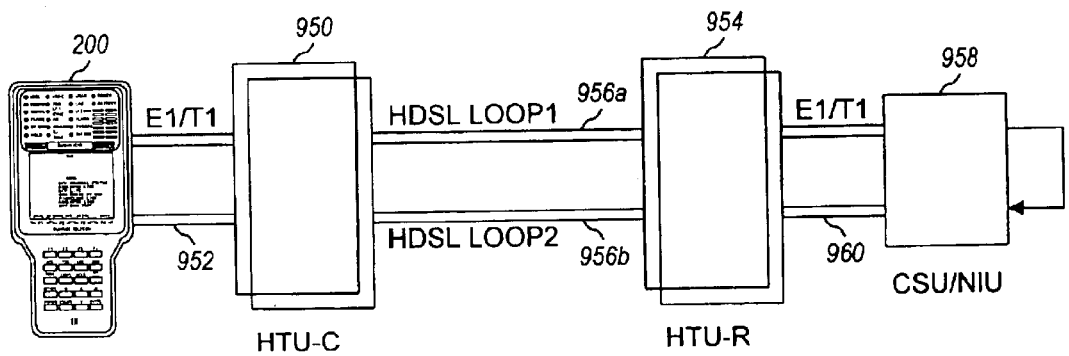
FIG. 9E shows a test set up for E1 and T1 testing on a HDSL span.

FIG. 9E shows a test set up for E1 and T1 testing on a HDSL span. Test set 200 couples a HTU-C 950 through a T1/E1 connection 952. HTU-C 950 couples to HTU-R 954 through wire pairs 956a and 956b. HTU-R 954 couples to a CSU/NIU 958 through another T1/E1 connection 960. CSU/NIU 958 is configured as a loopback.

In the E1 and T1 testing mode, test set 200 can perform the following tests: (1) E1/T1 end-to-end BERT, (2) E1/T1/HTU loopback control, and others. These tests implement the T1 loopback test.

Figure 9F:
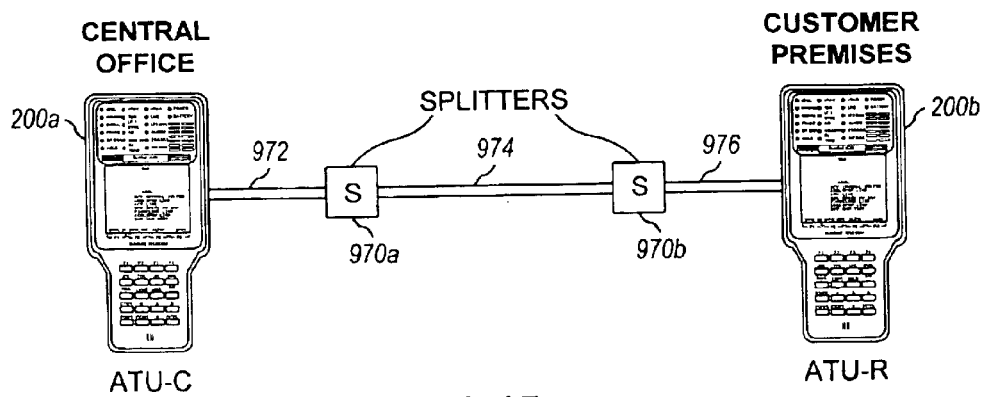
FIG. 9F shows a test set up for simultaneous ATU-C and ATU-R emulation.

FIG. 9F shows a test set up for simultaneous ATU-C and ATU-R emulation. Test set 200a couples a splitter 970a through a connection 972. Splitter 970a couples to another splitter 970b though a wire pair 974. Wire pair 974 is the connection being tested. Test set 200b couples to splitter 970b through a connection 976.

In the simultaneous ATU-C and ATU-R emulation mode, test sets 200 verifies that the wire pairs can carry ADSL with an acceptable error rate.

Figure 9G:
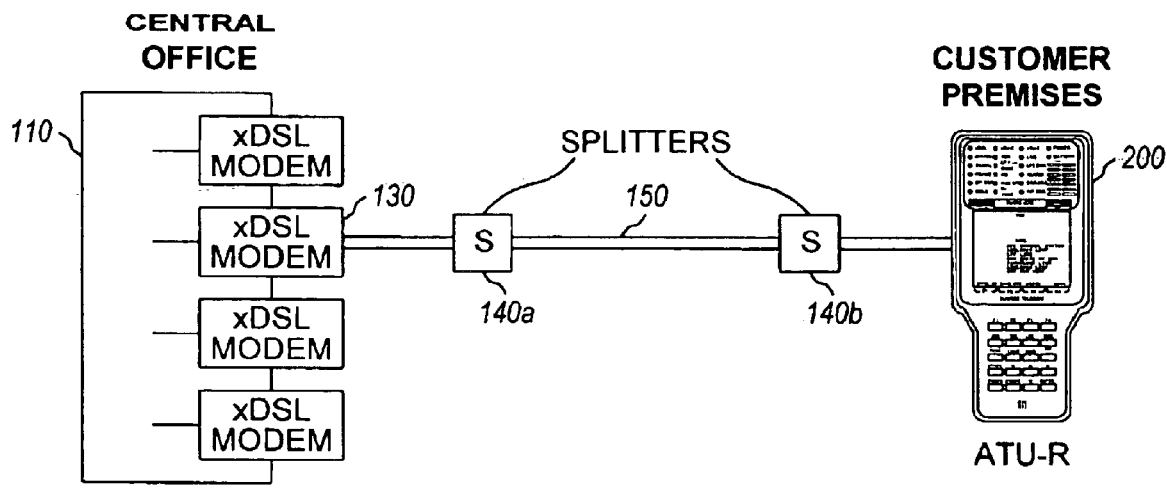
FIG. 9G shows a test set up for testing ATU-C function.

FIG. 9G shows a test set up for testing ATU-C function. This test set up is similar to the configuration shown in FIG. 1, except that the modem at the customer premises is replaced by test set 200.

Figure 9H:
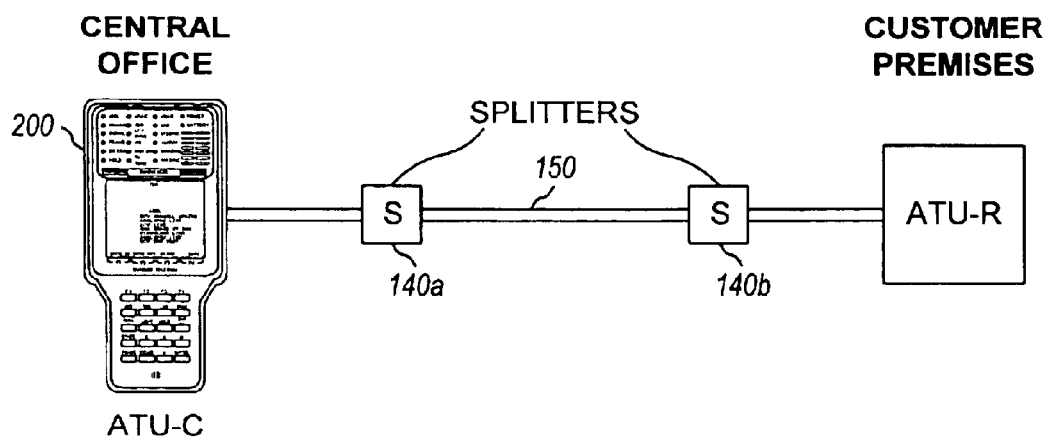
FIG. 9H shows a test set up for testing ATU-R function.

FIG. 9H shows a test set up for testing ATU-R function. This test set up is similar to the configuration shown in FIGS. 1 and 9G, except that the modem at the central office is replaced by test set 200.

In the ATU-C and ATU-R function mode, test sets 200 verifies that the customer premise equipment is working properly.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, a test set can be designed with more or fewer line qualification tests and more or fewer connectivity tests than those disclosed. Furthermore, different graphical displays can be generated for the test results. Thus, the present invention is not intended to be limited to the embodiments shown herein but is to be accorded the widest scope consistent with the principles and novel features disclosed herein and as defined by the following claims.

What is claimed is:

1. A test set for testing a digital subscriber line (xDSL) communications network, comprising:

at least one xDSL signal input port that connects the test set to the xDSL communications network;

line qualification test circuitry, coupled to the at least one xDSL signal input port, that performs line qualification testing on the xDSL communications network;

an xDSL modem module that attaches removably to the test set, wherein the xDSL modem module emulates a particular type of xDSL modem, enabling the test set to test the xDSL communications network in accordance with the particular type of xDSL modem;

an internal bus that couples the line qualification test circuitry and the xDSL modem module;

a processor, coupled to the internal bus, that operates with the line qualification test circuitry to selectively generate line qualification test data, and with the xDSL modem module to selectively generate xDSL connectivity test data, and that selectively processes the line qualification test data and the xDSL connectivity test data, in accordance with a user selection; and a display unit, coupled to the internal bus, that selectively displays one or more of the line qualification test data and the xDSL connectivity test data in accordance with the user selection, wherein the test set stores a software program and executes selected portions of the software program as determined by the xDSL modem module emulating the particular type of xDSL modem.

2. The test set of claim 1 wherein the line qualification includes transmission line tests, and wherein the transmission line tests includes at least one of digital multimeter tests, transmission impairment measurement set (TIMS) tests, and time domain reflection (TDR) tests.

3. The test set of claim 1 wherein the display unit is a graphical display unit.

4. The test set of claim 3 wherein the graphical display unit shows selected ones of the test data in a graphical form.

5. The test set of claim 1 wherein the xDSL communications network is one of a DSL communications network, a high-speed DSL communications network, and an asymmetric DSL communications network.

6. The test set of claim 1 wherein the xDSL connectivity test data includes bit-error-rate test data and loopback test data.

7. The test set of claim 1 wherein the xDSL modem module determines a maximum transmission rate on the xDSL communications network based on the xDSL connectivity test data.

8. The test set of claim 1, wherein the xDSL modem module is configured as a plug-in card.

9. The test set of claim 1, wherein the xDSL modem module includes a stored identification value, wherein the test set reads the stored identification value when the xDSL modem module is attached to the test set, and wherein the test set performs xDSL tests that relate to the stored identification value.

10. The test set of claim 1, wherein the xDSL modem module emulates a central office xDSL modem, and wherein the test set is configured to test respective ends of an xDSL loop with a second test set that includes a respective xDSL modem module that emulates a remote xDSL modem.

11. The test set of claim 1, wherein the test set is configured to test respective ends of an xDSL loop with one of a central office xDSL modem and a remote xDSL modem that also corresponds to the particular type of xDSL modem.

12. A test set for testing a digital subscriber line (xDSL) communications network, comprising:

at least one xDSL signal input port that connects the test set to the xDSL communications network;

line qualification test circuitry, coupled to the at least one xDSL signal input port, that performs line qualification testing on the xDSL communications network;

an xDSL modem module that attaches removably to the test set, wherein the xDSL modem module emulates a particular type of xDSL modem, enabling the test set to test the xDSL communications network in accordance with the particular type of xDSL modem;

an internal bus that couples the line qualification test circuitry and the xDSL modem module;

a processor, coupled to the internal bus, that operates with the line qualification test circuitry to selectively generate line qualification test data, and with the xDSL modem module to selectively generate xDSL connectivity test data, and that selectively processes the line qualification test data and the xDSL connectivity test data, in accordance with a user selection; and a display unit, coupled to the internal bus, that selectively displays one or more of the line qualification test data and the xDSL connectivity test data in accordance with the user selection, wherein the test set is configured as a master test set and a second test set is configured as a slave test set, wherein the xDSL modem module of the master test set and the xDSL modem module of the slave test set both emulate the particular type of xDSL modem, and wherein the master test set and the slave test set each perform respective functions to test the xDSL communications network.

13. The test set of claim 12, wherein the xDSL modem module is configured as a plug-in card.

14. The test set of claim 12, wherein the xDSL modem module includes a stored identification value, wherein the test set reads the stored identification value when the xDSL modem module is attached to the test set, and wherein the test set performs xDSL tests that relate to the stored identification value.

15. The test set of claim 12 wherein the line qualification includes transmission line tests, and wherein the transmission line tests includes at least one of digital multimeter tests, transmission impairment measurement set (TIMS) tests, and time domain reflection (TDR) tests.

16. The test set of claim 12 wherein the display unit is a graphical display unit.

17. The test set of claim 16 wherein the graphical display unit shows selected ones of the test data in a graphical form.

18. The test set of claim 12 wherein the xDSL communications network is one of a DSL communications network, a high-speed DSL communications network, and an asymmetric DSL communications network.

19. The test set of claim 12 wherein the xDSL connectivity test data includes bit-error-rate test data and loopback test data.

20. The test set of claim 12 wherein the xDSL modem module determines a maximum transmission rate on the xDSL communications network based on the xDSL connectivity test data.

* * * * *